United States Patent [19]
LaPerre

[11] Patent Number: 5,620,775
[45] Date of Patent: Apr. 15, 1997

[54] LOW REFRACTIVE INDEX GLASS MICROSPHERE COATED ARTICLE HAVING A SMOOTH SURFACE AND A METHOD FOR PREPARING SAME

[75] Inventor: James D. LaPerre, River Falls, Wis.

[73] Assignee: Minnesota Mining and Manufacturing Company, St. Paul, Minn.

[21] Appl. No.: 552,850

[22] Filed: Nov. 3, 1995

[51] Int. Cl.$^6$ .................................................... B32B 5/16
[52] U.S. Cl. .................... 428/149; 428/143; 428/40.2; 428/41.8; 428/204; 428/323; 428/325; 428/338; 359/536; 359/538; 359/539; 359/540; 359/537; 359/541; 156/298; 427/163.4
[58] Field of Search .................................. 428/143, 149, 428/40.2, 41.8, 204, 323, 325, 338; 359/536, 538, 539, 540, 537, 541; 156/298; 427/163.4

[56] References Cited

U.S. PATENT DOCUMENTS

| | | | |
|---|---|---|---|
| 2,326,634 | 8/1943 | Gebhard et al. | 359/540 |
| 3,172,942 | 3/1965 | Berg | 359/518 |
| 3,700,305 | 10/1972 | Bingham | 350/105 |
| 3,758,192 | 9/1973 | Bingham | 350/105 |
| 3,764,455 | 10/1973 | Lovell et al. | 428/149 |
| 4,102,562 | 7/1978 | Harper et al. | 350/105 |
| 4,328,274 | 5/1982 | Tarbutton et al. | 428/149 |
| 4,849,265 | 7/1989 | Ueda et al. | 428/40 |
| 4,961,770 | 10/1990 | Johnson et al. | 65/21.3 |
| 5,344,705 | 9/1994 | Olsen | 428/323 |

Primary Examiner—William Watkins
Attorney, Agent, or Firm—Gary L. Griswold; Walter N. Kirn; Janice L. Dowdall

[57] ABSTRACT

This invention relates to glass microsphere (bead) coated articles having an upper surface comprising a layer of low refractive index transparent glass microspheres such as those made from recycled ordinary glass. The articles of the invention have an extremely smooth tactile feel and a low friction surface even though they can be prepared from glass microspheres intermixed with abrasive irregularly shaped glass particles. The invention also relates to the method making the bead coated articles of the invention and transfer articles that can be used to make the bead coated articles of the invention.

43 Claims, 6 Drawing Sheets

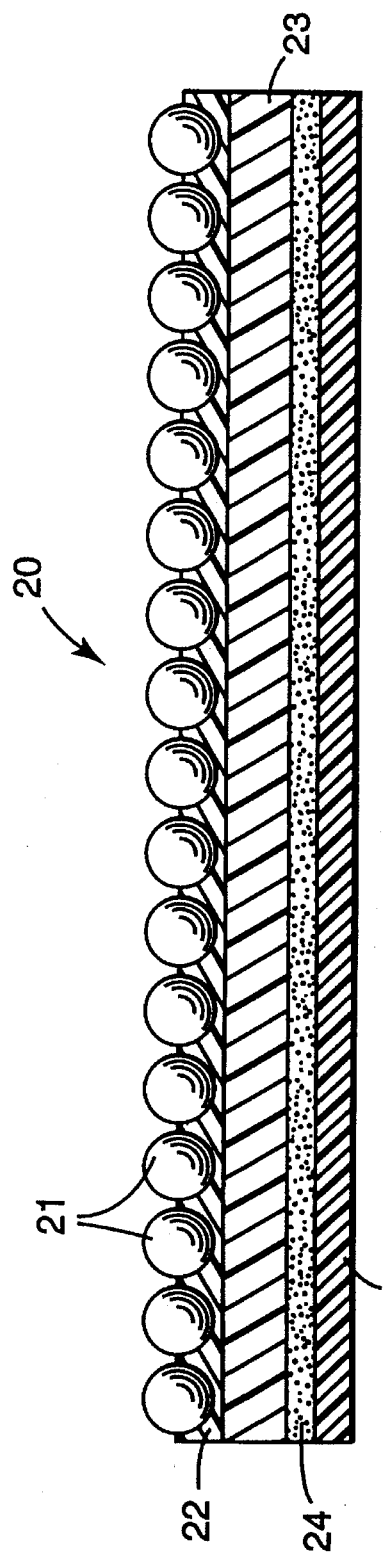
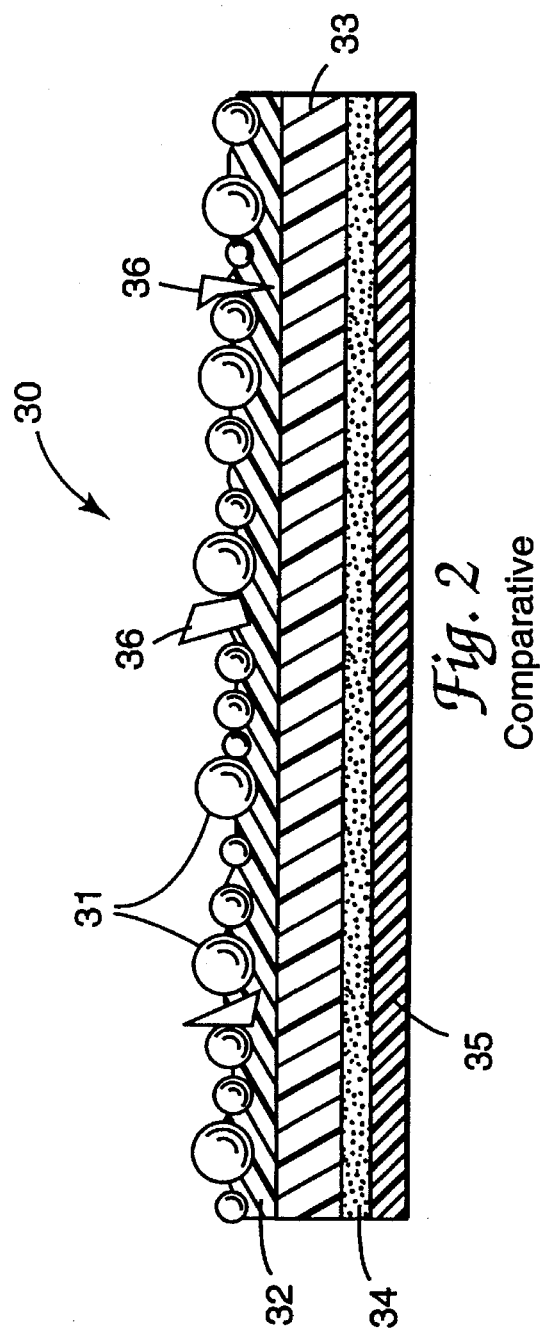

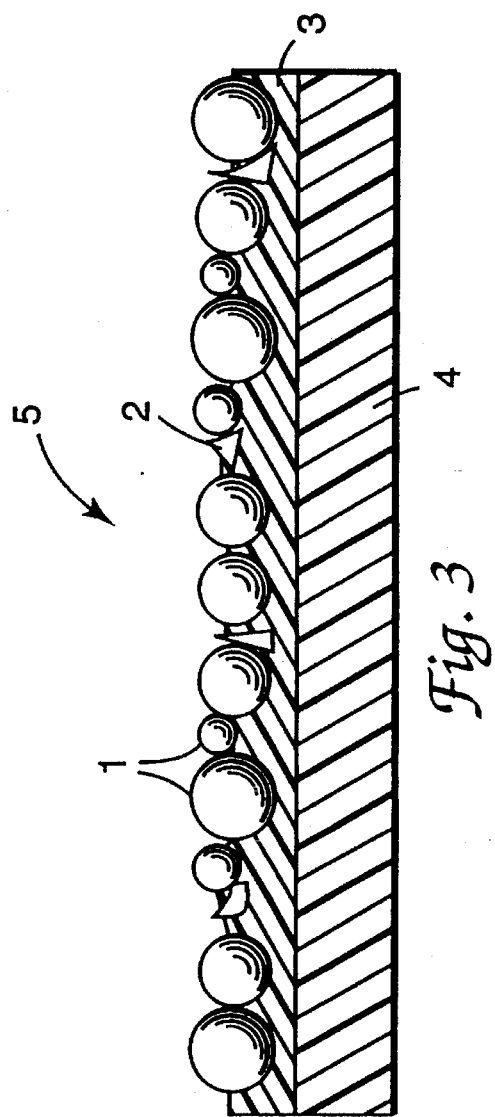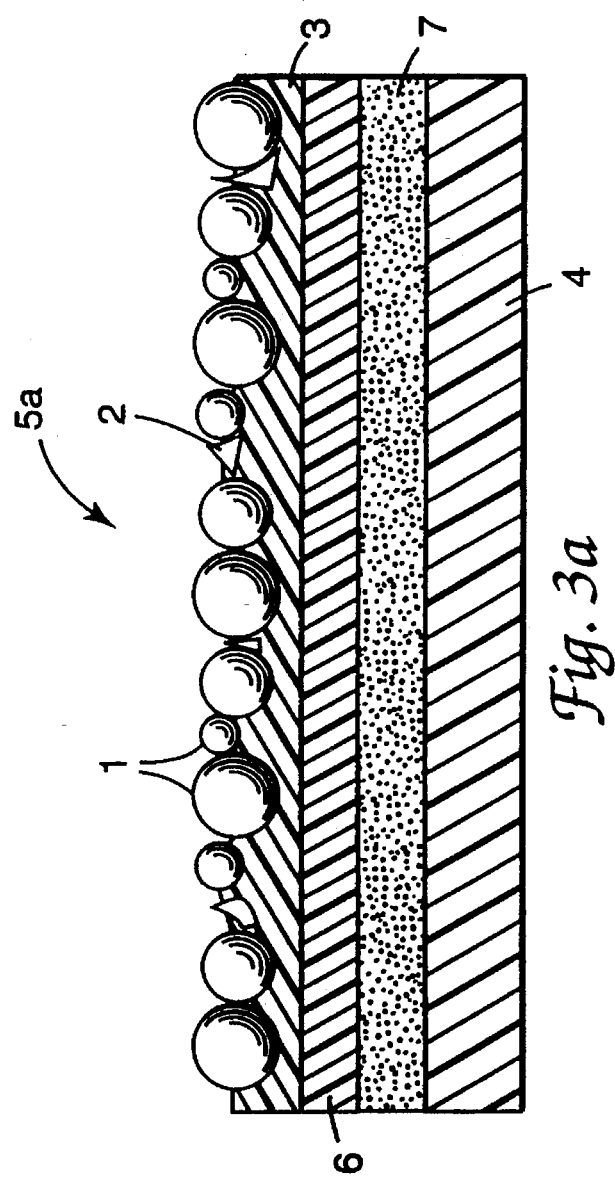

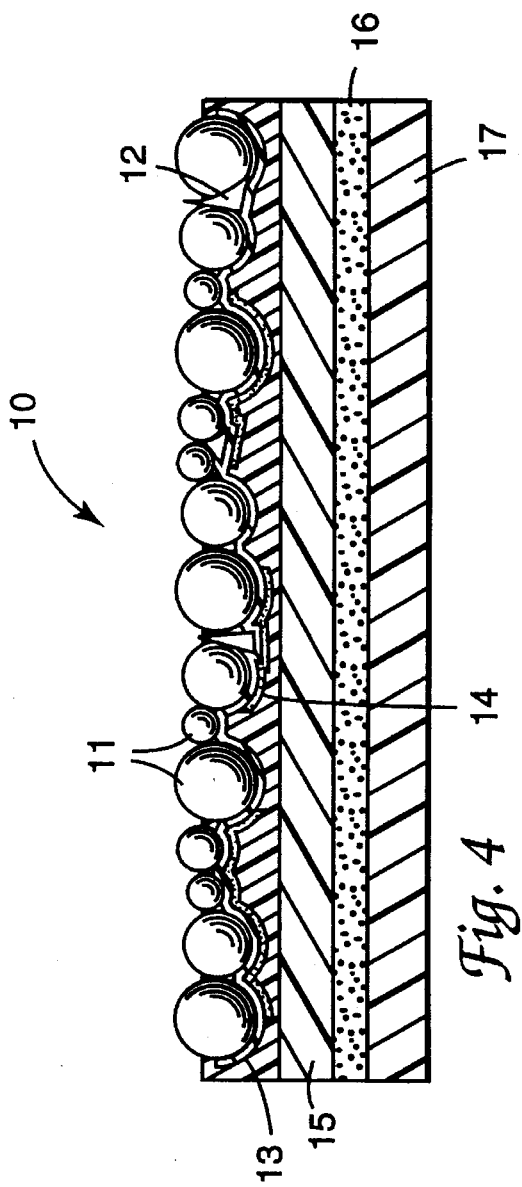
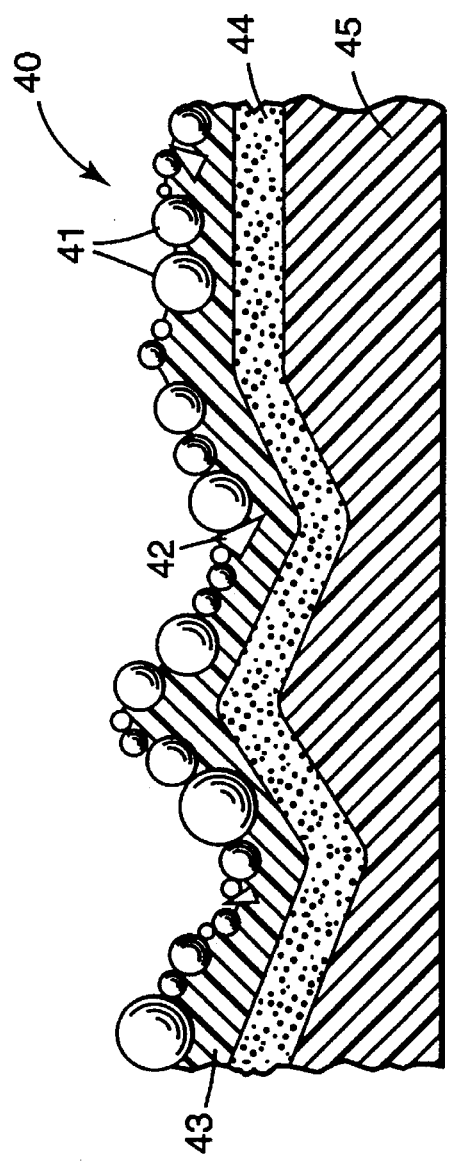

LOW REFRACTIVE INDEX GLASS MICROSPHERE COATED ARTICLE HAVING A SMOOTH SURFACE AND A METHOD FOR PREPARING SAME

FIELD OF THE INVENTION

This invention relates to glass microsphere (bead) coated articles having an upper surface comprising a layer of low refractive index transparent glass microspheres such as those made from recycled ordinary glass. The articles of the invention have an extremely smooth tactile feel and a low friction surface even though they can be prepared from glass microspheres intermixed with abrasive irregularly shaped glass particles.

More specifically, the invention relates to sheets, fabrics or decorated articles, which have a surface layer of small diameter glass microspheres having exposed hydrophilic surfaces. The articles of the invention can be prepared by the method of the invention which minimizes the abrasive effects of the optionally broad size range distribution of the glass microspheres plus the irregularly-shaped non-spherical particles which are intermixed therewith.

The surface of the bead coated articles of the invention can possess a combination of desirable properties, such as low gloss, accurate color transmission, good abrasion resistance, optional wide observation angle retroreflectivity, and a slippery feeling surface that does not stick to the skin when moistened by rain, perspiration, or the like.

The invention also relates to the method making the bead coated articles of the invention and transfer articles that can be used to make the bead coated articles of the invention.

BACKGROUND OF THE INVENTION

It is well known to coat the surface of sheets with transparent glass microspheres to provide retroreflection, decoration and improved resistance to abrasion, weather and water. For example, Gebhard et al. in U.S. Pat. No. 2,326,634, teaches that maximum brilliancy in reflex-reflection is achieved in exposed lens transparent glass bead structures through use of expensive high refractive index glass beads in the range of 1.7–1.9, which lies far above the refractive index range of 1.5–1.55 of ordinary glass. No reference was made to any irregularly shaped glass particles intermixed with the beads. A reflecting binder layer was disposed under the half-exposed glass beads to achieve reflex-reflection. To make the reflex-reflecting sheet the beads were coated over a soft, tacky under cured binder which was subsequently cured, during which the beads became embedded to roughly one-half of their diameters. The beads varied in size, with the larger beads projecting out of the binder surface more than the smaller beads.

Lovell teaches in U.S. Pat. No. 3,764,455 a retroreflective surface of exposed glass beads for coating the sides of elastomeric articles such as tires by sprinkling glass beads of 50–300 micrometers on the surface of an elastomeric, pigment containing adhesive while it is still in an adhesive state. No reference was made to the refractive index of said glass beads. No reference was made to any irregularly shaped glass particles intermixed with the beads. Examples were provided using smaller beads which were lower in retroreflection because they tended to become encapsulated by the resin into which they were sprinkled.

Berg teaches in U.S. Pat. No. 3,172,942 a reflex-reflecting transfer film which is provided with a dry strippable carrier on its reflex-reflecting face for bonding a mono-layer of high refractive index glass beads to fabrics, followed by removal of the carrier to expose the surface of the embedded glass spheres. Examples were provided where the structure was made in reverse fashion upon a removable carrier, wherein the carrier had a meltable plastic coating in which the glass beads could be embedded temporarily to roughly one-half their diameters and subsequently coated with an elastomeric binder. The refractive index of the glass beads was specified to the 1.7–1.9 criteria. No reference was made to any irregularly shaped glass particles intermixed with the glass beads.

Bingham, in U.S. Pat. No. 3,758,192, taught a retroreflective sheet structure using a particular transfer method which also provided diffuse and retroreflected color by disposing a dispersion of a reflective nacreous pigment in a substantially transparent binder which contained colored pigment on the buried side of the glass beads. Bingham's examples again were focused on high refractive index glass beads of 1.9. No reference was made to any irregularly shaped glass particles intermixed with the beads. Bingham further taught in U.S. Pat. No. 3,700,305 a sheet material which used a transparent, substantially color-free vapor deposited multi-layer dielectric mirror coating on the buried side of the glass beads which would allow good color transmission of pigmented layers buried below the reflector coat. Typically, this dielectric mirror would retroreflect the color of the incident light. However, this reflector coat was also capable of retroreflective color when the dielectric layers were properly chosen and spaced to act as a visible light pass band filter.

In both Bingham and Berg, graphic images were disposed on a separate substrate by die-cutting an image from the described sheet material and separately bonding the same to a substrate. Harper, in U.S. Pat. No. 4,102,562, describes a more convenient retroreflective imaged transfer sheet wherein the beads were transferred image-wise, after printing a portion of the bead-coated transfer sheet with an ink that was also an adhesive. A transparent dielectric reflecting layer was deposited on the surface of the glass beads before printing the ink/adhesive image, so the color of the ink was visible under daytime viewing. However, this method results in no transmission of printed ink/adhesive color under retroreflective conditions. Harper's examples again used expensive high refractive index glass. Harper makes no reference to glass beads intermixed with irregularly shaped glass particles.

Olsen, in U.S. Pat. No. 5,344,705, overcame a limitation of Harper by providing a transfer image structure which would retroreflect more than one color by printing a second ink containing nacreous reflecting particles on a first transparent colored layer, followed by printing an adhesive transfer layer. Again, his specification and examples focused on expensive high refractive index glass beads. Again, Olsen makes no reference to glass beads intermixed with irregularly shaped glass particles.

Ueda, et al. discloses, in U.S. Pat. No. 4,849,265, a decorative, protective beaded sheeting with exposed glass beads, formed by disposing the beads on a flexible substrate having an adhesive thereon in a tacky state, pressing the beads into the adhesive to flatten the outer surface, and subsequently curing the same. Ueda makes no reference to glass beads intermixed with irregularly shaped glass particles. The claimed construction provides a thin, flexible over-coating which maintains the spherical shape of the surface. This surface coating over the beads is present to reduce noise and increase resistance to sliding of hard objects placed and moved thereon. This surface coating, however, covers the natural hydrophilic character of the glass surface. Thus, Ueda et al. utilizes glass beads for decoration and protection. The method of Ueda et al., however, does not lead to articles comprising low refractive index glass beads and irregularly shaped glass particles having a low friction surface of smooth tactility.

SUMMARY OF THE INVENTION

We have discovered a unique bead coated article which can be prepared from low refractive index transparent glass beads, especially the economical glass beads available from the recycling of ordinary glass which are intermixed with a number of irregularly shaped glass particles.

In addition to their potential decorative and protective properties the bead coated articles of the invention surprisingly have a low friction surface with a smooth tactility against skin, which feels like silk.

Furthermore, the glass bead coated surface of the article of the invention has a hydrophilic surface even when using an adhesion promoter. This surface has been found to retain a large portion of its slipperiness against skin when it is wet with water or dampened by perspiration which broadens its utility to include use in seating materials, clothing linings, orthopedic devices, and the like.

The glass bead coated surface of the bead coated article of the invention may or may not exhibit retroreflectivity, depending on whether a suitable material such as pigment(s) are present in the article beneath the glass beads and the type of material(s) selected. Optionally some areas of the surface of the article of the invention may exhibit a retroreflective character, while other areas do not.

In the bead coated articles of the present invention the low refractive index glass beads are exposed such that the apex of each bead is at or about the same level, even when a fairly broad distribution of bead diameter is used in the bead layer population.

Glass beads prepared from recycled low refractive index (i.e., about 1.5 to about 1.6 refractive index) glass typically contain an amount of irregularly shaped glass particles. These irregularly shaped and abrasive glass particles present in the population of glass beads are partially embedded in the glass bead adhesive layer of the bead coated article of the invention such that the irregularly shaped particles do not extend to a substantial extent, (preferably not at all) above the apex of the beads such that the bead coated article surface has the requisite smoothness (as measured by the coefficient of friction). The specular surfaces of these irregularly shaped particles further enhance the appearance of the bead coated articles of the invention.

The low refractive index of the glass beads and irregularly shaped glass particles intermixed therewith used according to the invention would be closer to the refractive index of the available bead adhesive materials used to hold the beads in place (as opposed to high refractive index glass beads which differ more in refractive index from the bead adhesive in which they are typically embedded) thus providing superior color transmission of any buried graphic layers.

If the bead coated article of the invention is additionally designed to exhibit at least some retroreflection by virtue of having a reflecting layer in a cupped configuration behind (i.e. over the unexposed surfaces of the glass beads), the resulting retroreflection has a lower level but broader observation angle than if the bead coated articles of the invention used high refractive index beads rather than low refractive index beads. By "a cupped configuration" it is meant that the reflecting layer conforms to the unexposed glass bead surfaces. If the reflecting layer behind (i.e. over the unexposed surfaces of) the low refractive index glass beads is an ink layer containing nascent particles and transparent pigment, the retroreflected color is closer to the actual color of the ink layer than if the article of the invention used high refractive index beads rather than low refractive index beads. Both of these properties are important in accurately preserving the graphic intent of bead coated articles of this invention intended for decoration.

Further, the bead coated article of the invention may have both retroreflective image(s) and non-retroreflective image(s), the article of the invention still having its ultrasmooth surface tactility.

The present invention thus provides a bead coated article comprising:

(a) a first adhesive layer;

(b) a layer of a mixture of transparent glass beads intermixed with irregularly shaped glass particles, said mixture optionally treated with an adhesion promoter, wherein the layer of glass beads and irregularly shaped glass particles are partially embedded in the first adhesive layer such that about 20% to about 70% of the average diameter of the glass beads is exposed, wherein the first adhesive layer is capable of adhering to the mixture of the glass beads and the irregularly shaped glass particles;

wherein the average cross-sectional diameter of the mixture of the glass beads and the irregularly shaped glass particles, for at least 95 percent by weight of the mixture ranges from about 20 microns to about 180 microns;

wherein at least 95% by weight of the total number of glass beads and irregularly shaped glass particles fall within a threefold range such that the smallest and largest cross-sectional diameters differ by a factor of about 3 or less;

wherein the bead coated article comprises at least about 3% irregularly shaped glass particles by average count per unit area of the glass bead coated article based on the average total count per unit area of the glass bead coated article of the glass beads plus the irregularly shaped glass particles, wherein the aforesaid average count of irregularly shaped glass particles is based on irregularly shaped glass particles having a cross-sectional diameter equal to or greater than the smallest cross-sectional diameter in the threefold range;

wherein the glass beads and irregularly shaped glass particles have refractive indices of between about 1.5 and about 1.6;

wherein the glass beads and irregularly shaped glass particles are positioned such that the coefficient of friction of a planer surface of the first adhesive having a continuous layer of the glass beads and irregularly shaped glass particles embedded therein is less than about 0.3.

The invention further provides a bead coated article of the invention wherein the bead adhesive layer is transparent and sufficiently thin such that it conforms to the spherical shape of the glass beads embedded therein.

The invention further provides a bead coated article of the invention wherein the bead adhesive layer is either a continuous layer or a discontinuous layer (in the form of an image) and the adhesive layer is bonded to a substrate (which may be rigid or flexible, for example) by virtue of a substrate adhesive (which may be continuous or discontinuous) between the substrate and the surface of the adhesive layer opposite the layer of embedded glass beads. Optionally, however, a substrate adhesive layer can be used to bond the colored polymeric layer to the substrate.

The invention further provides an article wherein one or more colored polymeric layers such as ink layers is(are) disposed in the form of an image(s) between the transparent bead adhesive layer (which is optionally a conforming layer) and the substrate. Within this embodiment is envisioned the option wherein a colored polymeric layer(s) can function as a substrate adhesive.

The invention further provides an article of the invention wherein the bead adhesive layer is optionally pigmented.

The present invention also provides a transfer article, wherein the transfer article of the invention can be used to make the bead coated article of the invention. The transfer article of the invention comprises:

(a) a transfer carrier, the transfer carrier comprising:
  (i) a support layer; and
  (ii) a thermoplastic glass bead release layer bonded to the support layer;

(b) a layer of a mixture of transparent glass beads and irregularly shaped glass particles, the mixture optionally treated with an adhesion promoter, formed on a side of the thermoplastic glass bead release layer opposite the support layer, such that the glass beads are embedded to between about 20% and about 70% of their average diameter in the thermoplastic glass bead release layer and at least some of the irregularly shaped glass particles are partially embedded in the thermoplastic glass bead release layer and some of the irregularly shaped glass particles are optionally, completely embedded in the thermoplastic glass bead release layer;

wherein at least 95% by weight of the total number of glass beads and irregularly shaped glass particles fall within a threefold range such that the smallest and largest cross-sectional diameters differ by a factor of about 3 or less;

wherein the average cross-sectional diameter of the mixture of the glass beads and the irregularly shaped glass particles, for at least 95 percent by weight of the mixture ranges from about 20 microns to about 180 microns;

wherein the glass beads and irregularly shaped glass particles have refractive indices of about 1.5 to about 1.6;

(c) a layer of a first adhesive, capable of adhering to the layer of the mixture of the glass beads and the irregularly shaped glass particles, the mixture optionally treated with an adhesion promoter; wherein the first adhesive layer is formed on the surfaces of the glass beads and irregularly shaped glass particles not embedded in the thermoplastic glass bead release layer such that the glass beads are embedded to between about 30% to about 80% of their average diameter in the first adhesive layer, wherein the adhesion of the first adhesive to the glass beads is stronger than the adhesion of the thermoplastic release layer to the glass beads, wherein the aforesaid average count of irregularly shaped glass particles is based on irregularly shaped glass particles having a cross-sectional diameter equal to or greater than the smallest cross-sectional diameter in the threefold range;

wherein the transfer articles comprise at least about 3% irregularly shaped glass particles by average count per unit area of the transfer article based upon the total count of the glass beads plus the irregularly shaped glass particles per unit area of the transfer article;

wherein the glass beads and irregularly shaped particles are positioned such that upon removal of the transfer carrier from the transfer article the coefficient of friction of a planer surface of the first adhesive layer having a continuous layer of glass beads and irregularly shaped glass particles partially embedded therein is less than about 0.3.

The invention further provides the above-described transfer article wherein the first adhesive layer is transparent and is sufficiently thin to conform to the spherical surfaces of the glass beads.

The invention further provides the previously described transfer article wherein, the optional graphic image(s) disposed thereon also function as the optional substrate adhesive.

The invention further provides a method of making the transfer article of the invention, the method comprising the steps of:

(a) providing a transfer carrier, the transfer carrier comprising a thermoplastic glass bead release layer bonded to a support layer;

(b) partially embedding a layer of a mixture of transparent glass beads and irregularly shaped glass particles, the mixture optionally treated with an adhesion promoter such that the glass beads are embedded to between about 20% and about 70% of their average diameter in the thermoplastic glass bead release layer and at least some of the irregularly shaped glass particles are partially embedded in the release layer and some of the irregularly shaped glass particles are optionally, completely embedded in the release layer;

wherein the average cross-sectional diameter of the mixture of the glass beads and the irregularly shaped glass particles, for at least 95% by weight of the mixture ranges from about 20 microns to about 180 microns;

wherein at least 95% by weight of the total number of glass beads and irregularly shaped glass particles fall within a threefold range such that the smallest and largest cross-sectional diameters differ by a factor of about 3 or less;

wherein the transfer article comprises at least about 3% irregularly shaped glass particles by average count per unit area of the transfer article based on the average total count per unit area of the transfer article of the glass beads plus the irregularly shaped glass particles, wherein the aforesaid average count of irregularly shaped glass particles is based on irregularly shaped glass particles having a cross-sectional diameter equal to or greater than the smallest cross-sectional diameter in the threefold range;

wherein the glass beads and irregularly shaped glass particles have refractive indexes of about 1.5 to about 1.6;

(c) bonding a layer of a first adhesive layer over the surfaces of the glass beads and irregularly shaped glass particles not embedded in the thermoplastic release layer;

wherein the adhesion of the first adhesive layer to the glass beads is stronger than the adhesion of the thermoplastic release layer to the glass beads;

wherein the glass beads and irregularly shaped particles are positioned such that upon removal of the transfer carrier of the transfer article the coefficient of friction of a planer surface of the first adhesive layer having a continuous layer of the mixture of the glass beads and irregularly shaped glass particles partially embedded therein is less than about 0.3.

BRIEF DESCRIPTION OF THE DRAWINGS

FIG. 1 is a cross-section of a prior art glass bead coated sheeting wherein a layer of high refractive index beads of equal diameter are depicted.

FIG. 2 is a cross-section of a comparative glass bead coated sheeting wherein an abrasive layer of high refractive index beads of differing diameters intermixed with non-spherical irregularly shaped glass particles is provided.

FIG. 3 is a cross-section of one embodiment of a bead coated article of the invention.

FIG. 3A is a cross-section of another embodiment of a bead coated article of the invention having an optional reinforcing layer and an optional substrate adhesive layer bonded to a substrate.

FIG. 4 is a cross-section of another embodiment of the bead coated article of the invention wherein optional continuous and discontinuous colored polymeric layers are illustrated.

FIG. 5 is a cross-section of another embodiment of the bead coated article of the invention which has been embossed to provide a textured surface.

DETAILED DESCRIPTION OF THE INVENTION

Transfer Carrier and Process

Figure 6:
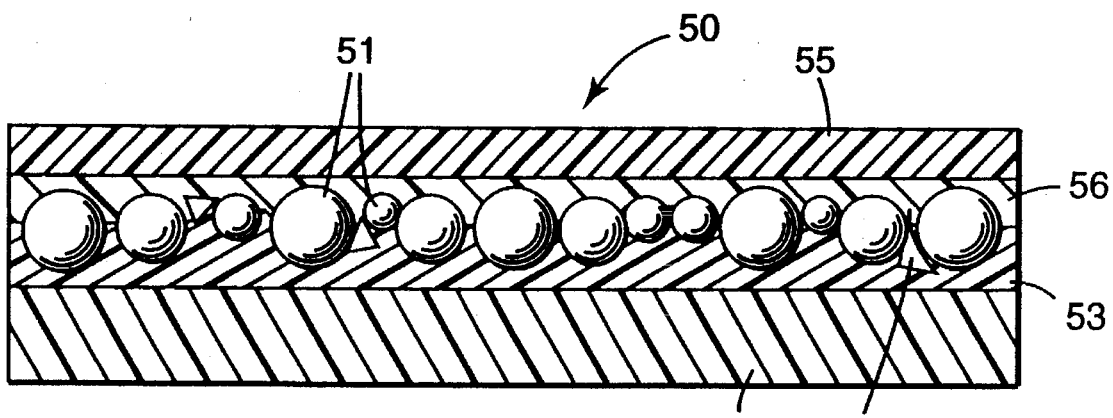
FIG. 6 is a cross-section of a transfer article of the invention.

The transfer coating method of the invention can be used to form the transfer article of the invention from which can be formed the bead coated article of the invention. This novel method provides a bead coated article having a uniform surprisingly smooth, exposed glass bead surface. The novel method surprisingly positions irregularly shaped glass particles which are intermixed with the glass beads used according to the invention such that the irregularly shaped glass particles do not project to a substantial extent (preferably not at all) above the exposed glass bead surface where they would introduce abrasion if they were present in substantial numbers.

The transfer coating method of the invention employs a transfer carrier which in its simplest form comprises a support layer and a thermoplastic release layer bonded thereto. The thermoplastic release layer of the transfer carrier temporarily partially embeds a layer of low refractive index glass beads. The transfer carrier has low adhesion to the glass beads and to the adhesive layer in which the opposite sides of the beads are partially embedded, so that the transfer carrier can be removed to expose the surface of the glass beads.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the transfer article of the invention. If the support layer is a thermoplastic layer it should preferably have a melting point above that of the thermoplastic release layer of the transfer carrier. Useful support layers for forming the transfer carrier include but are not limited to those selected from the group consisting of paper and polymeric films such as biaxially oriented polyethylene terephthalate (PET), polypropylene, polymethylpentene and the like which exhibit good temperature stability and tensile so they can undergo processing operations such as bead coating, adhesive coating, drying, printing, and the like. Paper and PET are preferred support layers.

Thermoplastic Release Layers

Useful thermoplastic release layers for forming the transfer carrier include but are not limited to those selected from the group consisting of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the glass bead adhesive, in addition to the beads.

The thickness of the thermoplastic release layer is chosen according to the bead diameter distribution to be coated. According to the transfer coating method of the invention the bead adhesive embedment becomes approximately the mirror image of the transfer carrier embedment. For example, a glass bead which is embedded to about 30% of its diameter in the release layer of the transfer carrier is typically embedded to about 70% of its diameter in the bead adhesive layer. To maximize slipperiness and packing density of the bead layer it is desirable to control the embedment process so that the upper surface of the smaller beads and the larger beads in a given population end up at about the same level after the transfer carrier is removed.

In order to partially embed the glass beads and irregularly shaped glass particles in the release layer, the release layer should preferably be in a tacky state (either inherently tacky and/or by heating). The glass beads and irregularly shaped glass particles may be partially embedded, for example, by coating a layer of transparent glass beads having intermixed therewith irregularly shaped glass particles on the thermoplastic release layer of the transfer carrier followed by one of (1)–(3):(1) heating the glass bead coated transfer carrier, (2) applying pressure to the glass bead coated transfer carrier (with, for example, a roller) or (3) heating and applying pressure to the glass bead coated transfer carrier.

For a given thermoplastic release layer, the bead embedment process is controlled primarily by temperature, time of heating and thickness of the thermoplastic release layer. As the thermoplastic release layer is melted, the smaller beads in any given population will embed at a faster rate and to a greater extent than the larger beads because of surface wetting forces. The interface of the thermoplastic release layer with the support layer becomes an embedment bounding surface since the beads will sink until they are stopped by the dimensionally stable support layer. For this reason it is preferable that this interface be relatively flat. Irregularly shaped glass particles mixed with the glass beads will also become at least partially embedded in the thermoplastic release layer. Most will become only partially embedded. Small irregularly shaped glass particles may become completely embedded in the thermoplastic release layer.

The thickness of the thermoplastic release layer should be chosen to prevent encapsulation of most of the smaller diameter glass beads so that they will not be pulled away from the bead adhesive layer when the transfer carrier is removed. On the other hand, the thermoplastic release layer must be thick enough so that the larger beads in the bead layer are sufficiently embedded to prevent their loss during subsequent processing operations (such as coating with the bead adhesive layer, for example).

Preferably, the thickness of the thermoplastic release layer is selected to be no less than about 70% of the diameter of the smallest bead falling within the 20 to 180 micron range nor more than about one fourth times the diameter of the largest bead falling within the 20 to 180 micron range to result in a corresponding bead adhesive embedment of about 30 to about 75 percent.

Low Refractive Index Glass Beads and Irregularly Shaped Glass Particles

The glass beads useful in the present invention are typically manufactured from economical low refractive index ordinary glass having a typical refractive index of about 1.50 to about 1.55. The glass beads are largely spherically shaped. The glass beads are typically made by grinding ordinary soda-lime glass or borosilicate glass, typically from recycled sources such as from glazing and/or glassware. The grinding process yields a wide distribution of glass particle sizes. The glass particles are spheroidized by treating in a heated column to melt the glass into spherical droplets, which are subsequently cooled. Not all the beads are perfect spheres. Some are oblate, some are melted together and some contain small bubbles.

The process of spheroidizing low refractive index glass results in retention of some percentage, typically at least about 3% by average count, more typically about 3 to about 15% by average count, even more typically about 5 to 15% by average count, and most typically about 6 to 12% by average particle count of irregularly shaped particles mixed with the beads based upon the total number of beads plus irregularly shaped particles of a defined minimum size using a microscopic counting method described hereinafter. The retention of irregularly shaped glass particles is believed to be due to incomplete or non-uniform flame treatment or as a result of cross contamination from handling the input materials in the same approximate location. The terms "irregularly shaped glass particles" and "irregular glass particles" are used interchangeably herein. The term "particles" when discussing the present invention only, is meant to include both the irregularly shaped particles and the glass beads. The irregularly shaped glass particles are typically randomly intermixed with the glass beads. Typically the articles of the invention are prepared from the glass bead/ irregularly shaped glass particle mixture such that the irregularly shaped glass particles and beads are randomly distributed within the layers in which they are present. Typically the ratio of irregularly shaped glass particles in a give uncoated sample of beads remains approximately the same as the ratio in a transfer article or a bead-coated article prepared therefrom.

Particle Sizing

The low refractive index glass beads and irregularly shaped glass particles are typically sized via screen sieves to provide a useful distribution of particle sizes. Sieving through screens does not separate the irregularly shaped particles from the beads. Sieving is also used to characterized the size of the irregular particles and the beads. With sieving, a series of screens with controlled sized openings are used and the particles passing through the openings are assumed to be equal to or smaller than that opening size. For beads, this is true because the cross-sectional diameter of the sphere is almost always the same no matter how it is oriented to a screen opening. For irregularly shaped particles, which can vary in cross-sectional diameter depending on particle orientation, the sieve screen opening does not always correspond to the maximum dimension of the particles. For purposes of defining the size of the irregular particles I use the term "average cross-sectional diameter". "Average cross-sectional diameter" is defined as the average sieve opening through which the distribution of irregularly shaped particles will pass. Thus the average cross-sectional diameter of the irregularly shaped glass particles corresponds to the size of the glass beads and the same size range applies. It is desirable to use as broad a bead size range as possible to control economics and maximize the packing of the beads on the bead adhesive surface. However, some applications may require limiting the bead size range to provide a more uniform bead coated surface. A useful range of bead diameters is about 20 microns to about 180 microns (typically about 35 to about 140 microns, preferably about 35 to 90 microns, and most preferably about 38 to about 75 microns). A small number (0 to 5% by weight based on the total number of beads plus irregularly shaped particles) of smaller and larger beads and irregularly shaped glass particles falling outside the 20 to 180 micron range can be tolerated.

To calculate the "average cross-sectional diameter" of a mixture of glass beads and irregularly shaped glass particles one would sieve a given weight of particles such as, for example, a 100 gram sample through a stack of standard sieves. The uppermost sieve would have the largest rated opening and the lowest sieve would have the smallest rated opening. For our purposed the average cross-sectional diameter can be effectively measure by using the following stack of sieves.

| U.S. Sieve Designation No. | Nominal Opening (microns). |
| --- | --- |
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |
| 500 | 25 |
| 635 | 20 |

For calculation purposes the defined cross-sectional diameter for a fraction of glass beads and irregularly shaped glass particles passing through a given sieve and being retained by the next smallest sieve is the average of the nominal openings. The two sieves are defined as a sieve pair. Thus, for example, if 20% of the weight of a given sample of beads and irregularly shaped particles passed through a 90 micron nominal opening, but did not pass through a 75 micron nominal opening, the cross-sectional diameter of the 20% fraction of that sieve pair would be (90+75)/2=82.5 microns. The weighted cross-sectional diameter for that fraction would then be 82.5×0.20=16.5 microns. The average cross-sectional diameter for the whole distribution of glass beads and irregular particles then becomes the sum of the weighted cross-sectional diameters of sieve pairs.

For a given mixture of beads and irregularly shaped glass particles having an average cross-sectional diameter falling within the range of about 20 to about 180 microns, 95% of the beads and irregularly shaped particles have a range of no more than about three times the smallest bead diameter, so that embedment in the transfer carrier's thermoplastic release layer can be managed to result in a corresponding embedment in the bead adhesive layer that is maximized to prevent loss of beads due to abrasion. It is preferred that the range of bead and irregular particles differ by no more than a factor of about 2.8, preferably not greater than about 2.4. (For example, a 25 micron thermoplastic release layer can embed a 35 micron bead about 70 percent which results in a 30 percent embedment in the bead adhesive layer. A 98 micron bead (2.8 times 35) can have about 25% embedment in the release layer, which results in about 75% embedment in the bead adhesive layer.

Irregularly Shaped Particle Counting

To characterize how many irregularly shaped glass particles exist within a given sample of uncoated glass beads and irregularly shaped glass particles one immerses several strips of transparent pressure sensitive tape (for example, a 25 by 50 mm rectangular strip) in the bead sample to coat each with a mono-layer of particles on the tape. Also, standard microscope slides coated with about 25 microns of a transparent pressure sensitive adhesive are useful alternatives for coating glass beads and irregularly shaped glass particles for characterization purposes. One must first shake the glass bead sample in a container to make sure the beads and irregularly shaped particles are well mixed. The coated sample is then placed under an optical microscope and a magnification and field of view chosen so that at least about 40 particles are visible. The particles are more visible when illuminated from below (in transmission). Partially visible particles on the edge of the field of view are excluded from the count. All glass beads are not completely spherical, but have seen sufficient heat in the process to eliminate all angular edges and therefore their abrasiveness. These particles having all rounded surfaces are counted as spheres. If a particle has at least one edge, it is counted as an irregularly shaped particle unless it is smaller in its largest dimension than the smallest bead diameter in the aforesaid threefold diameter range, in which case it is not included in the count. Irregular particles smaller in their largest dimension than the smallest bead in the threefold range are not considered abrasive since they would be surrounded by larger spheres when coated on the bead coated articles of the invention. In other words, to be counted as an irregularly shaped particle, the particle must have at least one dimension equal to or larger than the smallest bead diameter in the threefold range.

Based on the about 20 to about 180 micron size range of useful particles in the present invention the optimal field of view range is about 100X–250X. A picture is taken and the beads and the irregularly shaped particles are counted. The average count of irregularly shaped particles is expressed as a percentage and is defined as the average number of irregular particles in at least five representative samples divided by the average total number of particles (glass beads plus irregularly shaped particles) in those samples multiplied by 100.

To determine the irregular particle count on an article of the invention it is best to put it in a form where the light source can be placed below the sample. For a transfer article, if one uses a thin paper or a transparent or translucent film as the support carrier, one can readily characterize how a given thermoplastic glass bead release layer will coat a given population of glass beads containing irregular glass particles. To characterize an article where the transfer carrier is removed, the count of irregular particles in the exposed surface can be characterized by transferring it to an intermediate substrate that is transparent or translucent to make the glass particles easier to count.

The irregularly shaped glass particles and glass beads are positioned in the bead coated article of the invention such that the coefficient of friction limitation discussed elsewhere herein is met. The irregularly shaped glass particles are positioned in the bead adhesive layer such that the irregularly shaped particles are partially embedded in the bead adhesive layer and project up between the beads. It is preferred that any irregularly shaped particles that project up between the beads do not project above the upper surfaces of any beads or at least the immediately adjacent beads. However, some irregularly shaped particles may project above the upper surfaces of the beads as long as the coefficient of friction requirements are met. It is theorized that very minor amounts of irregularly shaped particles could become completely embedded in the first adhesive layer due to their becoming dislodged from the release layer during formation of the adhesive layer. This is acceptable because such an irregular particle would not be positioned to be abrasive.

Adhesion Promoter

Typically, the glass beads, including the irregularly-shaped glass particles intermixed therewith, are treated with an adhesion promoter such as those selected from the group consisting of silane coupling agent, titanate, organo-chromium complex, and the like, to maximize their adhesion to the bead adhesive layer, especially with regard to moisture resistance. Preferably, the adhesion promoter is a silane such as aminosilane, glyoxide silane, or acrylsilane, so that the resulting treated glass surface still exhibits a hydrophilic character.

The treatment level for such adhesion promoters is on the order of 50 to 500 parts by weight adhesion promoter per million parts by weight beads plus irregularly shaped particles. Beads having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the beads and irregularly-shaped particles, followed by drying in a tumbler or auger-fed dryer to prevent the beads from sticking together. One skilled in the art would be able to determine how to best treat the glass beads and irregularly shaped glass particles with an adhesion promoter.

Bead Adhesive Layer

The bead adhesive layer (also referred to as the "first adhesive layer" or a "bead bonding layer") is typically an organic polymeric material. It should exhibit good adhesion to the glass beads and irregularly shaped glass particles themselves or to the treated glass beads and treated irregularly shaped glass particles. It is also possible that an adhesion promoter for the glass beads could be added directly to the bead adhesive itself as long as it is compatible within the process window for disposing the bead adhesive on the bead surfaces. It is important that the bead adhesive has sufficient release from the thermoplastic release layer of the transfer carrier to allow removal of the transfer carrier from the beads which are embedded on one side in the thermoplastic release layer and on the other side in the bead adhesive layer.

Useful bead adhesives include, but are not limited to those selected from the group consisting of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicone containing copolymers, elastomers, such as neoprene, acrylonitrile butadiene copolymers, and compatible blends thereof.

The bead adhesive layer can be formed, for example, out of solution, aqueous dispersion, or 100% solids coating such as via hot melt or extrusion. Preferred bead adhesives are the aliphatic polyurethane aqueous dispersions and blends thereof with aqueous acrylic polymers and copolymers, thermoplastic polyamides and copolymers and vinyl plastisols and organosols. Most preferred bead adhesives are the aqueous aliphatic polyurethane dispersions because of their excellent solvent resistance, resistance to weathering, and the ease with which they may be cleaned.

The bead adhesive layer may be transparent, translucent, or opaque. It may be colored or colorless. The bead adhesive layer may, for example, be clear and colorless or pigmented with opaque, transparent, or translucent dyes and/or pigments.

If retroreflective performance is desired in at least a portion of the surface layer of the bead coated article of the invention, such that a reflecting layer (such as a thin metallic layer such as an aluminum flake ink layer, for example) is coated on the buried (non-exposed) side of the glass beads, it is preferred that the bead adhesive layer be transparent and thin such that it maintains the contours of the glass beads, so that it can also function as a spacing layer to focus the incident light on the reflecting layer placed below it.

The bead adhesive layer is typically formed on the transfer carrier after the beads and irregularly shaped particles have been partially embedded in the release layer of the transfer carrier. The bead adhesive is typically coated over the partially embedded glass beads and irregularly shaped glass particles by a direct coating process but could also be provided over the beads via thermal lamination either from a separate carrier or by first forming the bead adhesive layer on a separate substrate from which it is subsequently transferred to cover the beads and the irregularly shaped glass particles.

Substrate Layers

The bead coated articles and transfer articles of the invention can optionally comprise one or more substrate layer(s). Examples of suitable substrate layers include but are not limited to those selected from the group consisting of fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like.

The substrates may, for example, be in the form of a clothing article; automobile, marine, or other vehicle seat coverings; automobile, marine, or other vehicle bodies; orthopedic devices; etc.

In the transfer and bead coated articles of the invention, the glass bead/irregular particle layer is typically continuous although it may be discontinuous. The bead adhesive layer is typically continuous although it may be discontinuous. The substrate adhesive, when present, may be continuous or discontinuous. Typically, the substrate layer, when present, is continuous, although it may be discontinuous. In the bead coated articles of the invention all layers can optionally be continuous or discontinuous.

Graphic Layer Options

According to the present invention the glass bead adhesive can optionally also perform the function of acting as the adhesive for a desired substrate and/or further comprise pigment(s) such that it also has a graphic function.

The adhesive layer, when selected to function also as a substrate adhesive, may be, for example, pigmented and provided in the form of an image, such as, for example, by screen printing the adhesive in the form of a graphic for transfer to a separate substrate. However, the bead adhesive layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the transparent bead adhesive opposite the glass bead surface by at least one colored polymeric layer.

The optional colored polymeric layer may, for example, comprise an ink. Examples of suitable inks for use in the present invention include but are not limited to those selected form the group consisting of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer which can be an ink can be printed via a range of methods including, but not limited to screen printing, flexographic printing, offset printing, lithography, transfer electrophotography, transfer foil, and direct or transfer xerography. The colored polymeric layer may be transparent, opaque, or translucent.

If retroreflective performance is desired, the colored polymeric layer or multiple colored polymeric layers should be thin enough to maintain the contour of the beaded surface.

The last underlying layer should be a reflecting layer such as a polymeric layer containing nascent reflecting particles such as aluminum flake or a metallic layer such as vapor deposited aluminum. The resultant graphic image could be a combination of individual retroreflective and non-retroreflective images when opaque colored polymeric layers are printed in some areas and reflecting colored polymeric layers are printed in other areas. The graphic could encompass a broad range of color, especially if a 4-color graphic process is employed.

A colored polymeric layer(s) may be included in the articles of the invention by a number of procedures. For example, a transfer carrier can have a layer of glass beads and particles embedded in the release layer thereof, following which the bead embedded surface of the release layer is coated with a transparent layer of bead adhesive. This bead and adhesive coated transfer carrier can function as a casting liner by coating, for example, a continuous colored plasticized vinyl layer over the bead adhesive layer and wet laminating a woven or non-woven fabric thereover.

Another method involves providing graphic layers (discontinuous colored polymeric layers, for example) on the bead adhesive layer prior to casting a continuous colored plasticized vinyl layer to approximate the image of leather, for example.

Optional Adhesive Layer(s)

The bead coated article and transfer article of the invention may each optionally further comprise one or more adhesive layers in addition to the bead adhesive layer. A substrate adhesive layer, for example, may optionally be included in the article in order to provide a means for bonding the bead adhesive layer or the layer(s) of material optionally bonded to the bead adhesive layers to a substrate. These optional adhesive layer(s) may be optionally present when, for example, the bead adhesive layer cannot function also as an adhesive for a desired substrate. A substrate adhesive layer (as well as any other optional adhesive layers) may comprise the same general types of polymeric materials used for the bead adhesive layer and may be applied following the same general procedures. However, each adhesive layer used must be selected such that it will adhere the desired layers together. For example, a substrate adhesive layer must be selected such that it can adhere to an intended substrate as well as to the other layer to which it is bonded.

Reinforcing Layer(s)

Optional layers may be included in the bead coated article and transfer article of the invention to, for example, enhance the ability to separate the transfer carrier from the glass bead layer. Such an optional layer which in such an article can function as a reinforcing layer would typically be positioned in between the glass bead adhesive layer and a substrate adhesive layer. Examples of useful reinforcing layers would include additional substrate layer(s), for example.

A glass bead coated and adhesive coated transfer carrier could be coated with a fabric adhesive such as a polyester, or a polyamide, followed by lamination to a woven fabric or to a moisture transmitting membrane, to function as a slippery liner for clothing, for example.

Embossing

The articles of the invention may optionally be embossed. The embossing procedure would typically involve subjecting the article, bonded to an embossable substrate, and with the transfer carrier removed, to heat and pressure such as by a heated patterned roller assembly or a patterned heated platen press. For embossed articles it is preferable that the first adhesive layer not be melted during the embossing operation, to preserve the bead embedment level, while at the same time flexible enough to be deformed without cracking. Another method of embossing would be to thermally laminate the transfer article to an irregular substrate such as, for example a coarse fabric such that after the transfer carrier is removed, that the surface is conformed to the irregular layer below it.

The present invention will be better understood by referring to FIGS. 1–13.

FIG. 1 is an illustration of a cross-section of a prior art bead coated article 20 wherein a single layer of presumably monodisperse glass, hard plastic or soft plastic beads 21 have been coated via a direct coating method on a flexible substrate 24 similar to that of Ueda et al., U.S. Pat. No. 4,849,265. The beads are not intermixed with irregularly shaped particles. Article 20 includes a layer of glass beads 21 which have been electrostatically sprayed on the surface of an adhesive layer 22 while it was in a tacky state. The adhesive layer 22 is disposed on a flexible substrate layer 23. A pressure-sensitive adhesive layer 24 is disposed on a side of the flexible substrate layer 23 opposite the side which is bonded to adhesive layer 22. The pressure-sensitive adhesive layer 24 is protected by a removable release liner 25. The article 20 is suitable for lamination to another substrate (not shown).

FIG. 2 is an illustration of a comparative bead coated article 30 produced by a process similar to that disclosed in Ueda et al., U.S. Pat. No. 4,849,265 except that low refractive index glass beads intermixed with irregularly shaped particles are substituted for the beads of Ueda et al. A layer of a non-monodisperse glass bead 31 distribution containing irregularly-shaped glass particles 36 such as those obtained from spheroidized ordinary glass has been provided via spraying on an adhesive layer 32 while in a tacky state. Adhesive layer 32 is disposed on flexible substrate 33 having a pressure-sensitive adhesive layer 34 formed on a side of the flexible substrate 33 opposite adhesive layer 32. The pressure-sensitive adhesive layer 34 is protected by a release liner 35. The comparative article 30 has an abrasive surface due to the uneven surface provided by the broad distribution of glass beads 31 and the abrasive irregularly-shaped glass particles 36, a substantial number of which project above the plane of the glass bead 31 surface.

FIG. 3 is an illustration of embodiment of the bead coated article 5 of the invention having a layer of glass beads 1 of low refractive index and broad size range embedded in roughly a one-half state in bead adhesive layer 3. The bead adhesive layer 3 is disposed on a substrate 4. The irregularly shaped glass particles 2 are partially embedded in adhesive layer 3. The irregularly-shaped glass particles 2 that project up between glass beads 1 do not project sufficiently above the upper surface of the glass beads 1 that they introduce tactile abrasiveness. The upper surface of article 5 is free of exposed irregularly-shaped glass particles 2, and each bead 1 upper surface is at about the same level such that the surface does not feel abrasive.

FIG. 3A is an illustration of a cross-section of another embodiment of a bead coated article 5a of the invention which is identical to the article 5 of FIG. 3 except that an optional reinforcing layer 6 (such as a thermoplastic film layer) is disposed on adhesive layer 3 on a side opposite the layer of glass beads 1. In addition, an optional substrate adhesive layer 7 is disposed on a side of reinforcing layer 6 opposite bead adhesive layer 3. Optional substrate adhesive layer 7 is bonded on a side opposite reinforcing layer 6 to substrate 4.

FIG. 4 is an illustration of a cross-section of another embodiment of a bead-coated article 10 of the invention wherein a layer of low refractive index glass beads 11 of a broad size distribution is embedded in roughly a one-half state in a transparent bead adhesive layer 13 which conforms to the rounded shapes of the glass beads 11. Irregularly-shaped glass particles 12 are partially embedded in transparent adhesive layer 13 and do not project above the upper plane of the bead 11 surfaces. The upper surfaces of all the glass beads 11 are at about the same level regardless of size. In this particular embodiment the bead adhesive layer 13 is transparent so it can transmit buried graphic images. An ink image (discontinuous colored polymeric layer) 14 is attached to adhesive layer 13 on a side of adhesive layer 13 opposite that which has the glass beads 11 embedded therein. An optional continuous colored polymeric layer 15 has been disposed on the entire surface over the ink image 14 and the portions of the adhesive layer 13 not covered by the ink image 14. The optional colored layer 15 is adhered to substrate 17 via substrate adhesive layer 16.

FIG. 5 is an illustration of a cross-section of another embodiment of a bead coated article 40 of the invention wherein low refractive index glass beads 41 are embedded in roughly a one-half state in adhesive layer 43. Irregularly-shaped glass particles 42 are partially embedded in adhesive layer 43 and do not project above the upper surface of the beads 41. Substrate adhesive layer 44 is bonded to adhesive layer 43 on a side of adhesive layer 43 opposite that in which the glass beads 41 are embedded. Flexible and embossable substrate 45 is bonded to substrate adhesive layer 44 on a side of substrate adhesive layer 44 opposite that which is bonded to adhesive layer 43. The surface of the article 40 having the exposed beads 41 is textured due to post embossing of the composite structure. Even though the surface is textured via embossing, the upper exposed surfaces of adjacent glass beads 41 are at about the same level.

FIG. 6 is an illustration of a cross-section of an embodiment of a transfer article 50 of the invention, comprising a transfer carrier comprising temporary support layer 55 bonded to thermoplastic release layer 56. A layer of low refractive index glass beads 51 are temporarily embedded in roughly a one-half state in thermoplastic release layer 56. Adhesive layer 53 is disposed on thermoplastic release layer 56 and over glass bead layer 51 on the side of the beads 51 not embedded in thermoplastic release layer 56. Irregularly-shaped glass particles 52 are distributed in random fashion such that some particles 52 are partially embedded in thermoplastic release layer 56 and adhesive layer 53. The irregularly-shaped particles 52 which are partially embedded in both thermoplastic release layer 56 and adhesive layer 53 are embedded such that any of such partially embedded particles remaining in adhesive layer 53 after removal of the transfer carrier do not extend above the upper exposed surfaces of the beads 51 partially embedded in adhesive layer 53 to cause an abrasive surface. Release liner 54 is positioned against adhesive layer 53. The transfer article 50 may be used by removing release liner 54 to expose adhesive layer 53. Adhesive layer 53 can then be attached to a substrate (not shown). Support layer 55 and the thermoplastic release layer 56 to which it is bonded can be removed to expose the upper surface of low refractive index glass beads 51. The irregularly-shaped glass particles 52 which are more deeply embedded in thermoplastic release layer 56 than in adhesive layer 53 can be removed from a surface position upon removal of the support layer 55 and the thermoplastic release layer 55.

Figure 7:
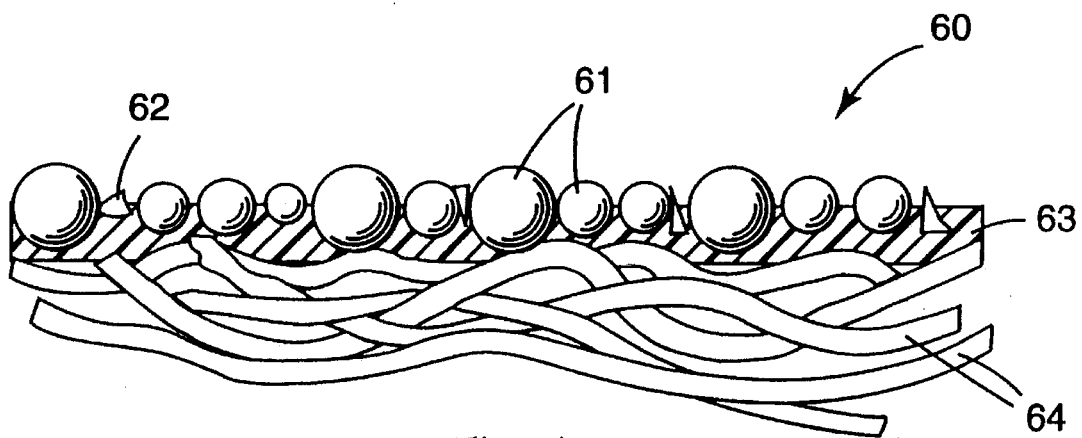
FIG. 7 is a cross-section of another embodiment of the bead coated article of the invention wherein the substrate layer is a fabric.

FIG. 7 is an illustration of cross-section of a bead coated article 60 of the invention comprising a layer of low refractive index glass beads 61 embedded in roughly a one-half state in bead adhesive layer 63. The upper surface of adjacent glass beads 61 are at about the same level regardless of bead 61 size. Bead adhesive layer 63 functions also as a substrate adhesive in adhering the beads 61 to fabric substrate 64. Irregularly-shaped glass particles 62 are embedded in adhesive layer 63 such that they do not project sufficiently above the upper surface of glass beads 61 to cause tactile abrasiveness. Article 60 could have been formed, for example, by thermal lamination of the article 9 of FIG. 6 to fabric substrate 64 after removal of release liner 54, followed by the removal of layers 55 and 56.

Figure 7A:
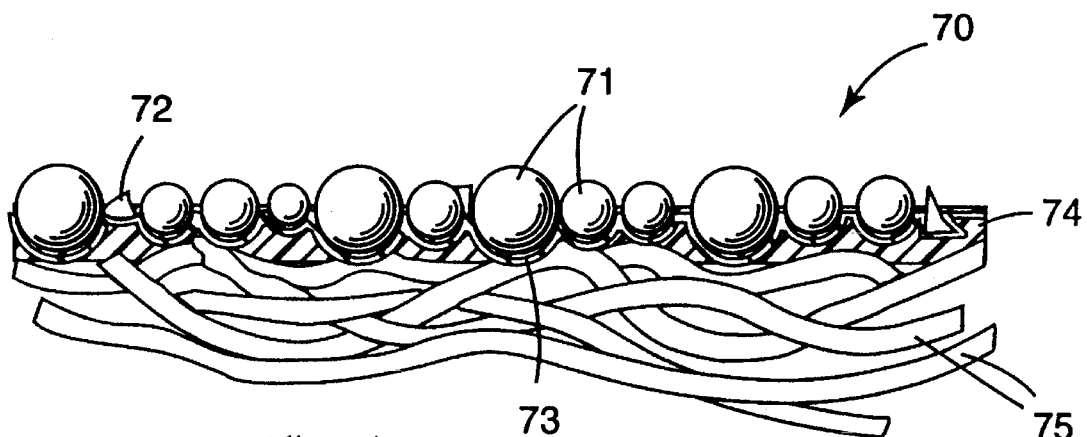
FIG. 7A is a cross-section of another embodiment of the bead coated article of the invention wherein the substrate is a fabric and which also comprises a substrate adhesive layer.

FIG. 7A is a cross-section of a bead coated article 70 of the invention comprising a layer of low refractive index glass beads 71 embedded in roughly a one-half state in adhesive layer 73 which conforms to the rounded surfaces of the glass beads 71. The upper surface of adjacent glass beads 71 are at about the same level regardless of bead 71 size. Substrate adhesive layer 74 is bonded to the side of bead adhesive layer 73 opposite that in which the glass beads 71 are embedded. Fabric substrate 75 is bonded to substrate adhesive layer 74. Irregularly shaped glass particles 72 are embedded in adhesive layer 73 such that they do not project sufficiently above the upper surface of glass beads 71 to cause tactile abrasiveness. Article 70 could have been formed, for example, by forming a substrate adhesive 74 on article 100 of FIG. 10 on the side of the transparent adhesive layer 103 away from the glass beads 101, followed by laminating to substrate 74, followed by removal of layers 104 and 105.

Figure 8:
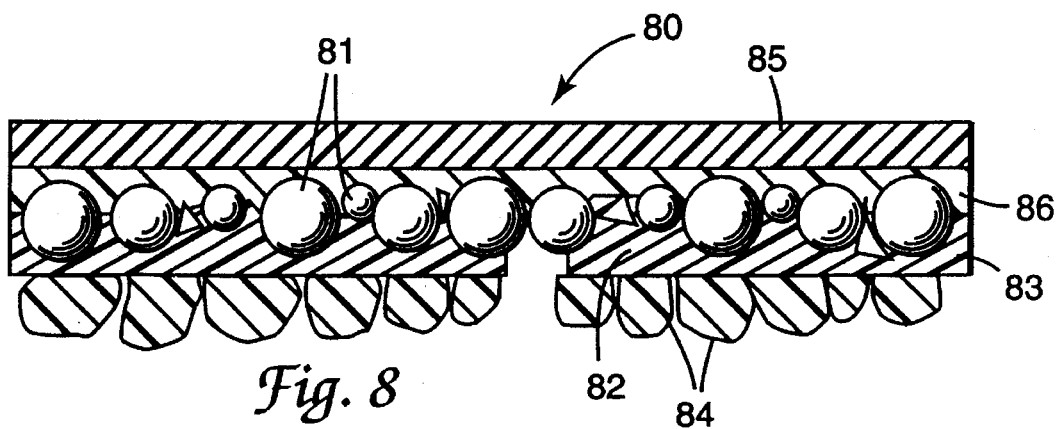
FIG. 8 is a cross-section of another embodiment of a transfer article of the invention wherein an ink layer in the form of an image has been formed on the glass bead layer embedded in the temporary carrier and subsequently coated while the ink was wet with a substrate adhesive in the form of a powder.

FIG. 8 is an illustration of a cross-section of a transfer article 80 of the invention comprising temporary support layer 85 bonded to thermoplastic release layer 86. A layer of low refractive index glass beads 81 are embedded in roughly a one-half state in thermoplastic release layer 86. An ink layer 83 has been formed in the shape of an image on portions of glass bead layer 81. Powdered substrate adhesive layer 84 is adhered to ink layer 83 but not on sections of the bead 81 layer not covered by discontinuous ink layer 83. Powdered substrate adhesive layer 84 could, for example, have been disposed on ink layer 83 while the ink was in a wet tacky state such that it adhered to ink layer 83, but did not adhere to portions of the glass bead layer 81 not covered by ink layer 83.

The transfer article 80 is useful for forming images on a portion of a substrate surface (not shown) resulting in an image containing the low refractive index glass bead 81 surface of the invention. This can be done by applying the transfer article 80 via heat and pressure sufficient to melt powdered substrate adhesive layer 84 to a substrate (not shown), followed by removal of temporary support layer 85 and thermoplastic release layer 86.

Figure 9:
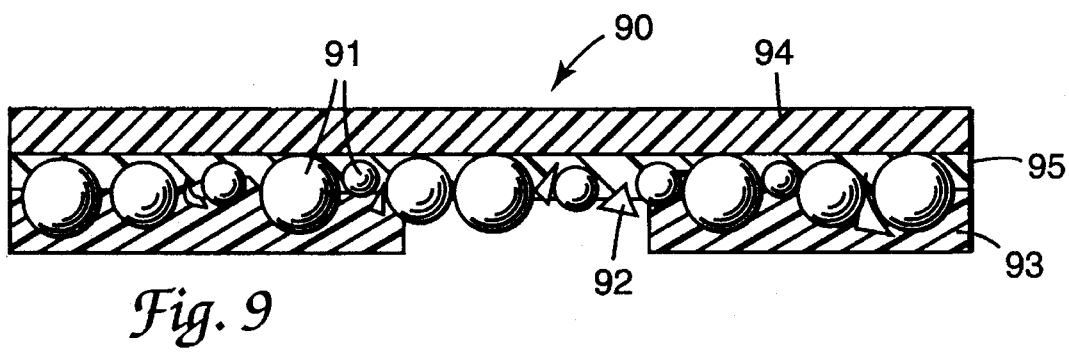
FIG. 9 is a cross-section of another transfer article of the invention wherein an optionally colored substrate adhesive in the form of an image has been formed on the glass beads embedded in the temporary carrier.

FIG. 9 is an illustration of a cross-section of a transfer article 90 of the invention comprising a temporary support carrier 94 bonded to thermoplastic release layer 95. A layer of low refractive index glass beads 91 are embedded in roughly a one-half state in thermoplastic release layer 95. Adhesive layer 93, optionally colored, is disposed in the form of an image (in a discontinuous layer) on portions of the glass bead 91 surface not embedded in the thermoplastic release layer 95. Irregularly-shaped glass particles 92 are randomly distributed such that most particles are partially embedded in both the thermoplastic layer 95 and in the adhesive layer 93. The transfer article 90 is useful for forming images on a portion of a substrate surface (not shown) by adhering the article 90 to a substrate (not shown) via adhesive layer 93, which also functions as a substrate adhesive, followed by removal of temporary support carrier 94 and thermoplastic release layer 95.

Figure 10:
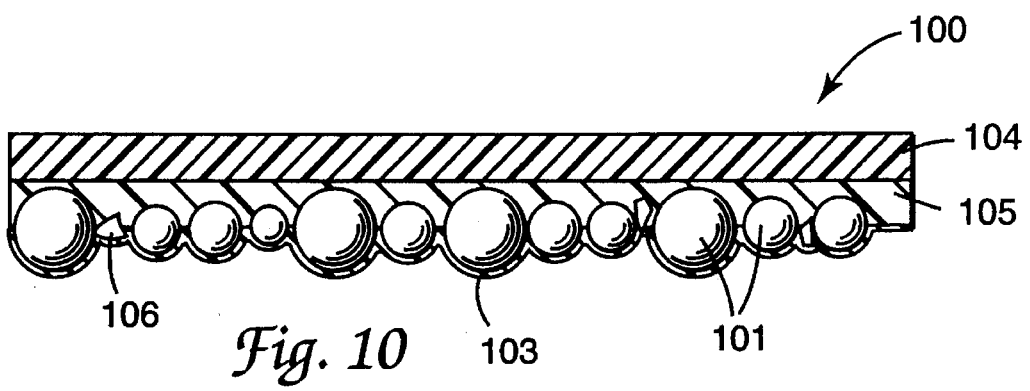
FIG. 10 is a cross-section of another embodiment of a transfer article of the invention wherein a transparent colorless bead adhesive layer has been formed on the glass beads embedded in the temporary carrier.

FIG. 10 is an illustration of a cross-section of a transfer article 100 of the invention, comprising a temporary carrier support layer 104 bonded to a thermoplastic release layer 105. A layer of low refractive index glass beads 101 are embedded in roughly a one-half state in the thermoplastic release layer 105. A thin, transparent bead adhesive layer 103 is disposed on the surface of the glass beads 101 not embedded in thermoplastic release layer 105, such that it conforms to the contours of the bead 101 surfaces. Irregularly-shaped glass particles 106 are randomly distributed, such that most are partially embedded both in thermoplastic release layer 105 and in transparent adhesive layer 103, and some are partially embedded in both layers 105 and 103. Transfer article 100 is potentially useful as a casting liner on which a substrate (not shown) is formed over and bonded to bead adhesive layer 103. Images could be optionally printed on article 100 over adhesive layer 103 prior to forming a substrate layer (not shown) thereover. For example, an ink image may be printed on bead adhesive layer 103, prior to providing a substrate layer (not shown) thereover. Thermoplastic release layer 105 and temporary carrier support layer 104 would be removed after forming of the substrate over the adhesive layer 103 to expose the low refractive index glass bead 101 surface of the article 100 of the invention.

Figure 11:
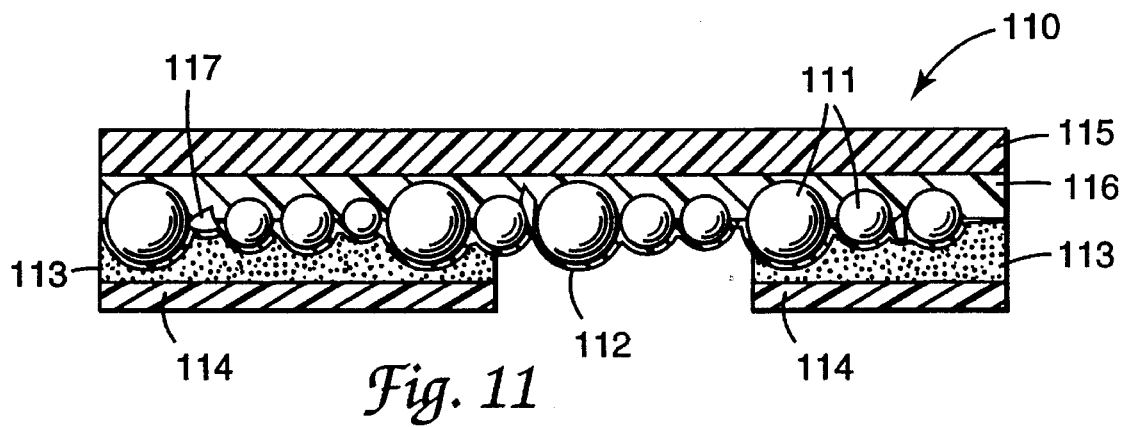
FIG. 11 is a cross-section of another embodiment of a transfer article of the invention wherein the transfer article of FIG. 10 has been printed with an ink layer in the form of an image, followed by the formation of an adhesive layer over the ink layer.

FIG. 11 is an illustration of a cross-section of a transfer article 110 of the invention which comprises a temporary support layer 115 bonded to a thermoplastic release layer 116. A layer of low refractive index glass beads 111 is embedded to roughly a one-half state in thermoplastic release layer 116. A thin, transparent adhesive layer 112 is bonded to the surface of the glass beads 111 not embedded in the thermoplastic release layer 116, such that it conforms to the contours of the glass bead 111 surfaces. Optional ink layer 113 is disposed in the form of an image on a portion of adhesive layer 112. Substrate adhesive layer 114 is bonded to a surface of optional ink layer 113 opposite that which is bonded to adhesive layer 112. Irregularly-shaped glass particles 117 are randomly distributed in the article 110 such that most are partially embedded in both the thermoplastic release layer 116 and in the adhesive layer 112. Transfer article 110 can be used by adhering substrate adhesive layer 114 to a substrate (not shown), followed by removal of temporary carrier support layer 115 and release layer 116. If the optional ink layer 113 contains, for example, nascent reflecting particles, a wide observation angle retroreflective image would be visible to a viewer.

Figure 12:
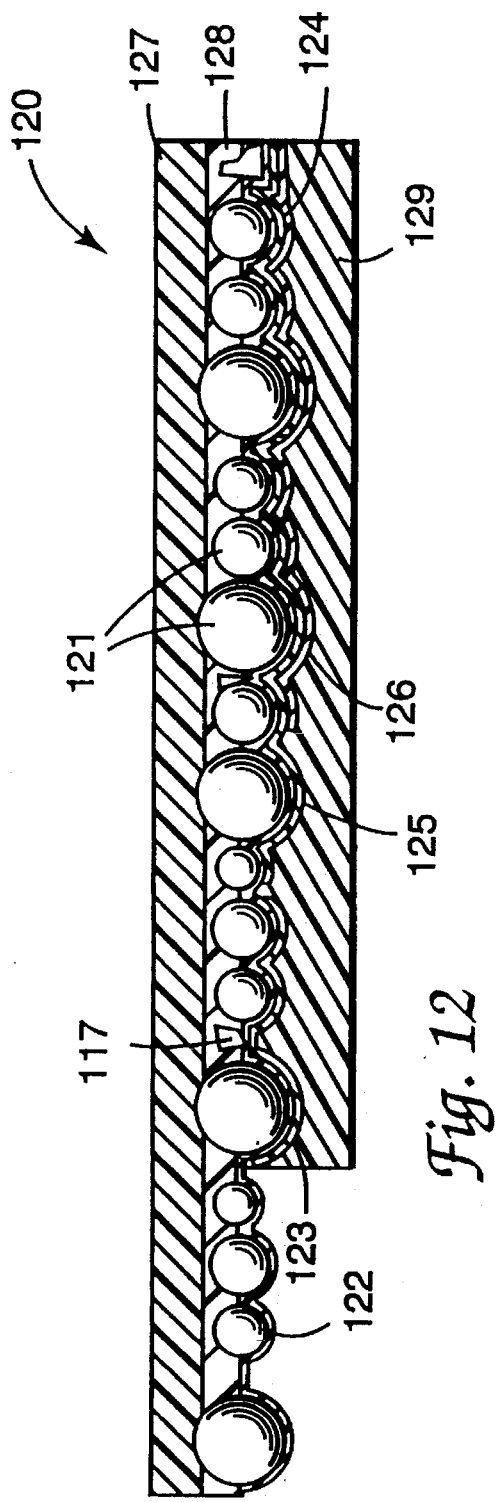
FIG. 12 is a cross-section of another embodiment of a transfer article of the invention wherein four ink layers have been printed on the transfer article of FIG. 10 such that each ink layer has a different image.

FIG. 12 is an illustration of a cross-section of a transfer article 120 of the invention which comprises temporary support layer 127 bonded to thermoplastic release layer 128. A layer of low refractive index glass beads 121 are embedded to roughly a one-half state in thermoplastic release layer 128. A thin, transparent bead adhesive layer 122 is bonded to a surface of glass bead layer 121 not embedded in thermoplastic release layer 128, such that it conforms to the contour of the glass bead 121 surface. Irregularly-shaped glass particles 117 are randomly distributed such that most are partially embedded in both the thermoplastic release layer 128 and in the adhesive layer 122. Ink layer 123 is bonded in the form of an image on a portion of adhesive layer 122. Ink layer 124 is bonded in the form of an image on a different portion of adhesive layer 122. Ink layer 125 is bonded in the form of an image on a different portion of adhesive layer 122. Ink layer 126 is bonded in the form of an image such that it covers portions of ink layer 125, adhesive layer 112, and ink layer 124. Substrate adhesive layer 129 is bonded on the entire surface of the combined ink layers.

Transfer article 120 would typically be attached to a substrate via adhesive layer 129 followed by removal of the temporary support layer 127 and thermoplastic release layer 128. If, for example, the substrate adhesive layer 129 contained aluminum flake reflecting particles, and ink layer 123 was an opaque black ink, ink layer 124 was a transparent magenta ink, ink layer 125 was a transparent cyan ink, and ink layer 126 was a transparent yellow ink printed via 4-color process, then the area of overlapped images of ink layers 126 and 124 would additionally provide an orange color and the area of overlapped images of ink layer 126 and ink layer 125 would provide a green color. Additionally, all the colors except the black would exhibit a wide observation angle retroreflectivity.

Figure 13:
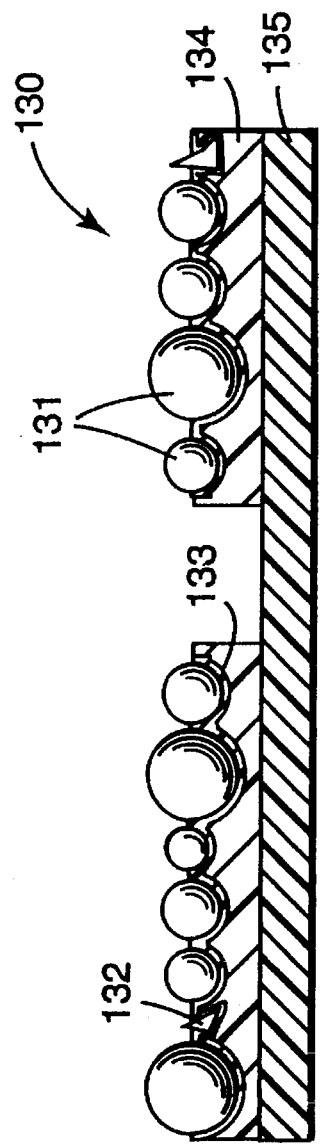
FIG. 13 is another embodiment of the bead coated article of the invention.

FIG. 13 is an illustration of a cross-section of a bead coated article 130 of the invention comprising an imaged (discontinuous) layer of low refractive index glass beads 131 embedded in a roughly one-half state in imaged (discontinuous) adhesive layer 133. A substrate adhesive layer 134 is bonded to adhesive layer 133 on a side of adhesive layer 133 opposite that in which the glass beads 131 are embedded to substrate layer 135. Irregularly-shaped glass particles 132 are randomly embedded in imaged adhesive layer 133 such that they do not project above the upper surface of glass bead image layer 131. Article 130 could be made, for example, by forming a discontinuous image of a substrate adhesive on transfer article 100 shown in FIG. 10, (not shown), followed by adhering the substrate adhesive to a separate substrate, followed by removal of layers 104 and 105.

Coefficient of Friction Measurement

"Coefficient of friction" is defined as the ratio of the resisting force that arises when a planer surface of one substance slides over an adjoining surface of another substance when acted upon by a perpendicular force.

To measure the coefficient of friction one must choose a reference surface. I choose low density polyethylene as a reference surface because it has a non-polar surface with low glass adhesion and is also somewhat deformable, like the skin.

Specifically, about a 125 micron thick film of 0.923 density polyethylene, having a melt index of about 10, extruded at about 240 Deg. C., using resin from Quantum chemical, Designated NA 219-000 was used as a reference surface.

The "Standard Test Method for Static and Kinetic Coefficients of Friction of Plastic Film and Sheeting" which is described in the American Society of Testing Materials (ASTM) D-1894, incorporated by reference herein, was chosen as the method because it is an accepted practice for distinguishing surface friction differences. To conduct the test each surface must be continuous and flat. Additionally, if the article of the invention was intended to be embossed, the coefficient of friction data that applies would be taken on the non-embossed planer sample.

The stated reference surface of low density polyethylene was heated at about 150 Deg. C. in a forced air oven for about 30 seconds to melt the surface and provide a uniform high gloss. The film was then conditioned (at about 23 Deg. C. and 50% relative humidity for 40 hours) and then attached via a 50 micron layer of pressure sensitive adhesive to a square, flat steel sled about 6 mm thick, with sides of 63.5 mm, on which was previously bonded a 3.2 mm thick elastomeric foam of about 0.25 g/cu. cm. density. The reference film was cut 5 mm longer in the direction of slide pull to allow wrapping of the leading edge of the foam covered sled.

The sled was placed on a clean rectangular sample of at least 70 mm by 195 mm of the conditioned test surface (having the exposed beads) which was in turn bonded to a level rectangular supporting base fitted in a universal tensile testing machine so that the sled could be pulled across the surface with a low friction parallel pulley/nylon filament system attached to a calibrated force transducer. Weight was added, centered on the sled, to result in about 300 g. total sled weight. (The referenced test method suggests a 200 g sled, but a 300 g sled was found to provide more consistent data).

The sled was pulled at a rate of about 30 mm/min. across the test surface for at least about 130 mm. At least three points were collected while the sled was moving such that the first point was beyond the first maximum force measured and the remaining points were greater than about 25 mm apart on the beaded sample. For example the first data point could be collected after the sled had moved 25 mm followed by a second data point 25 mm beyond the first data point and a third data point 50 mm beyond the second data point. The recorded frictional force for each run was the average of the three data points. If the reference film of polyethylene on the sled was scratched during a run it was replaced with a glossy reference surface sample. Five sample runs are collected for each beaded surface sample and the reported value of coefficient of friction was the grand average of the frictional force recorded for the five runs divided by the 300 g sled weight. The standard deviation is also typically reported and it is preferable that the standard deviation be less than 10% of the coefficient of friction value (most preferable 5%). The referenced test method provides for measurement and calculation of static and dynamic (kinetic) coefficient of friction. I have chosen dynamic coefficient of friction to approximate the tactile feel of the surface, since the precision was higher. The examples herein, which provide an average coefficient of friction value, used this method.

In order to determine the coefficient of friction for an article of the invention smaller than the above described 70 mm by 195 mm sample size one would proportionately reduce the size and weight of the sled. For example, if the largest available test surface was 20 mm by 40 mm, one would choose a sled smaller than 20 mm, i.e., a square sled, for example, of about 18 mm on a side weighted to 18/63.5× 300 g=85 g. The data collection points could be compressed proportionately so that on each sample three representative force measurements could be made on a 40 mm length. The first data point could be collected, for example after the sled had moved 40 mm/195 mm×25=about 5 mm, followed by the second data point 5 mm later, followed by the third data point 10 mm later.

EXAMPLES

The invention will be further explained by the following illustrative examples which are intended to be non-limiting. Unless otherwise indicated, all parts, percentages, ratios etc., are by weight in the Examples and elsewhere herein.

Example 1

A transfer carrier liner was made by extruding about a 25 micron thick thermoplastic release layer of low density polyethylene resin from Quantum Chemical, designated NA 219-000 and having a melt index of about 10, at about 240 Deg. C. on a 96 micron biaxially oriented support layer of heat stabilized polyethylene terephthalate (PET) film and treated with an ultraviolet corona while the polyethylene was molten, to adhere the polyethylene to the polyester. Ordinary soda-lime glass beads primarily from recycled glazing obtained from Flex-O-lite Inc. from their Muscatine, Iowa plant were treated via spray drying with about 300 parts per million A-1100 amino functional triethoxy silane from OSi Specialties Inc. The silane was dispersed at about 10% solids in 95%/5% ethanol/water. The beads were dried at about 90 degrees C. for 30 minutes. The following size distribution of the treated beads and irregularly shaped glass particles as approximately measured by sieving were cascade coated on the above transfer carrier at about 105 Deg. C. and subsequently heated at about 120 Deg. C. for about 1.5 minutes to partially embed the beads:

| Sieve Pair Nominal Opening** | Weight %* |
| --- | --- |
| 150–180 | 0.3 |
|  | (some agglomerates of beads) |
| 125–150 | 1.2 |
| 106–125 | 3.7 |
| 190–106 | 7.9 |
| 75–90 | 10.3 |
| 53–75 | 12.6 |
| 53–63 | 14.1 |
| 45–53 | 24.1 |
| 38–45 | 24.7 |
| 25–38 | 1.1 |

*Weight % of total beads and irregular particles
**in Microns

The calculated average cross-sectional diameter of this population was about 58 microns. (The irregularly shaped glass particles were approximately equally distributed throughout the bead size population with an average count of about 10% based upon the total count of the beads and the irregularly shaped particles. 95% by weight of the beads and irregulars fell within a threefold cross-sectional diameter range of about 38 microns to about 115 microns. The average count of irregular particles was based on particles having at least one dimension equal to or greater than 38 microns. The larger beads and the agglomerated beads were only loosely held by the liner, such that mild surface abrasion could dislodge them. The beads having diameters below about 100 microns were held sufficiently, so that a subsequent processing operation resulted in less bead loss.

A bead adhesive was made according to the following formula:

16.6% Bayhydrol 121 Aqueous polycarbonate polyurethane dispersion from Miles Inc.

13.8% NeoTac™ R-9314 Aqueous polyester polyurethane dispersion from Zeneca Resins 19.3% Distilled Water 0.05% BYK™ 025 defoamer, believed to be a polyoxyethylene modified polydimethyl siloxane, from BYK Chemie 0.05% Triton™ GR-7M di-2-ethylhexyl sodium sulfosuccinate surfactant from Rohm and Haas 2.0% Stabilizer solution having:
3 parts of Uvinol™ N-3039, a substituted acrylonitrile UV absorber from BASF and
1 part Tinuvin™ 123, a hindered amine light stabilizer from Ciba Geigy@ 13.8% solids in diethylene glycol monobutyl ether.

5.2% solvent, diethylene glycol monobutyl ether 43.0% isopropyl alcohol (The above percentages are based on the total weight of the bead adhesive.)

The above solution was made up in the given order of addition under mild mixing with a low shear air mixer. Immediately prior to coating, 0.25 parts per 100 parts solution of CX-100™, a polyaziridine crosslinker from Zeneca Resins was mixed in with an air mixer. The solution was coated onto the bead side of the transfer carrier with a 12.7 cm diameter 60 Shore A durometer rubber squeeze roll against a 80 durometer back-up roller at a nip pressure of about 1.5 Kg/sq. cm. and having a contact width of 0.35 meters, with a line speed of about 4.5 meters/sec. The coated transfer carrier was dried at 65 Deg. C. for about one minute followed by 108 Deg. C. for about 2 minutes. This resulted in an adhesive coated casting liner of the invention as approximated in FIG. 10, wherein a thin layer of adhesive is conformed over the surface of the beads. The transfer article had an average count per unit area of about 9.9% of irregular particles equal to or larger in at least one dimension than 38 microns based on the total count of the beads plus the irregular shaped particles per unit area.

Example 2

The resulting casting liner of Example 1 was coated in a knife coater at a wet thickness of about 125 microns with the following substrate adhesive:

79.1% NeoRez™ R-9630, an aqueous carboxylated polyurethane dispersion from Zeneca resins 20.6% diethylene glycol monobutyl ether 0.15% BYK™ 025 defoamer from BYK Chemie 0.15% Triton™ GR-7M surfactant from Rohm and Haas Immediately prior to coating, 0.50 parts (per 100 parts adhesive solution) of CX-100™, a polyaziridine crosslinker from Zeneca Resins was added in with an air mixer.

After coating, the adhesive was dried for 5 minutes at about 108 Deg. C. The adhesive coated web was hot laminated to a smooth marine grade vinyl fabric seating material at about 130 Deg. C. and cooled to room temperature, followed by removal of the transfer carrier. This resulted in a cross-section similar to that shown in FIG. 3. The resulting composite sheet had a low gloss surface and a slippery skin tactility. The average dynamic coefficient of friction was found to be about 0.248 with a standard deviation of about 0.004 as measured by the previously defined method. Note that the polyethylene surfaced sled showed very slight scratching after 3 runs and was replaced for the 4th and 5th runs. The resulting sheet, when wet with water, also exhibited low skin friction compared with the uncoated vinyl fabric.

Example 3

The resulting primed casting liner of Example 1 was screen printed with a 156 HD mesh polyester screen with an image of the following ink which also functions as an adhesive for a vinyl substrate:

150 parts NeoRez™ R-9630, an aqueous carboxylated polyester polyurethane dispersion from Zeneca resins 12 parts stabilizer solution consisting of:
  0.9 parts of Tinuvin™ 1130, a benzotrialzole ultraviolet absorber from Ciba-Geigy; 0.5 parts Tinuvin™ 123, a hindered amine light stabilizer;
  0.2 parts Troysan Polyphase™ AF-1,3-iodo,2-propyl butyl carbonate fungicide from Troy Chemical; and
  10.4 parts diethylene glycol monobutyl ether.

1.5 parts Surfynol™-104PA, 2,4,7,9,-tetramethyl 5 decyn-4,7-diol a surfactant from Air Product & Chemical 0.3 parts Silwet™ L-7210, a modified polydimethylsiloxane copolymer flow modifier from OSi specialties 2.3 parts BYK™-025, a defoamer from BYK Chemie 40 parts Aqualour™ 36B14, a phthalocyanine blue pigment dispersion in octylphenoxypolyethoxyethanol and tetramethyldecynediol and water from Penn Color 30 parts Stapa Hydroxal™ W. 16 N.L. aluminum pigment from Obron Atlantic 3.5 parts Aerosil™-200, a fumed silica flow modifier from Degussa.

The printed sheet was dried at about 105 Deg. C. for 5 minutes. The resulting screen printed image on the transfer carrier would approximately correspond to the cross-section illustrated in FIG. 11 with the exception that layers 113 and 114 were combined into one layer.

The above imaged web was hot laminated for about 15 seconds in a 110 Deg. C. platen press at a force of about 1.5 kg/sq. cm. onto a vinyl coated automotive seating fabric, followed by cooling to room temperature and removal of the transfer carrier. Only the printed area transferred to the vinyl. The image was then reheated in the platen press for about 8 more seconds to emboss the beads to the same level as the vinyl surface. The resulting low gloss blue image, which had a cross-section which would correspond approximately to that exhibited by FIG. 13, exhibited a low level of retroreflectivity when a light source was behind the viewer, which provided a decorative effect.

Example 4

The transfer carrier liner of Example 1 was bead coated in the manner of Example 1 with a smaller and narrower fraction of low refractive index glass bead and irregularly shaped glass particle distribution with about 95% falling within a 25–75 micron cross-sectional diameter range with an average cross-sectional diameter of about 51 microns. The average count of irregularly shaped particles was about 7% per unit area by average total count per unit area of beads plus irregular particles based on irregular particles larger in at least one dimension than 25 microns. In this case the beads were not pre-treated with a silane coupling agent. The resulting bead coated sheet was knife coated with about a 50 micron orifice, as measured above the top surface of the partially embedded beads, with the following adhesive:

100 parts SX864B polyamide modified vinyl plastisol obtained from Plast-O-Meric SP Inc. of Sussex, Wis.

4 parts of A-1100 amino functional triethoxysilane from OSi Specialties Inc.

In this case, the silane was added to the plastisol by mixing it in with a low shear air mixer immediately prior to coating. The adhesive coated bead coat was placed in a forced air oven set at about 125 Deg. C. for about 20 seconds to gel the plastisol. At this point the sheet material corresponds approximately to FIG. 6, except that the release liner is not present. The sheet material was then thermally laminated in a platen press to a smooth, light cotton muslin fabric, ROc-lon™ #404 permanent press muslin from Pastad Mills Div. of Rockland Industries at about 170 Deg. C. and about 3 Kg./sq. cm pressure for about 22 seconds to fuse the plastisol and bond it to the fabric. After cooling to room temperature, the transfer carrier was removed to reveal the bead coated surface. The adhesion of the beads to the modified fused plastisol adhesive, which was initially poor, continued to build up over 48 hours as the silane coupling agent reacted. The resulting non-retroreflective bead coated fabric, which corresponds approximately to FIG. 7 had a silky skin tactility and could function as an abrasion resistant lining for clothing.

The same plastisol coated bead coat was thermally laminated to a coarse woven polyester automotive fabric using the same conditions. After cooling and removal of the transfer carrier, the surface of the bead coat was textured and was conformed to the woven irregular surface of the coarse fabric, which corresponds approximately to FIG. 5.

Example 5

A bead coated and primed transfer carrier was made according to Example 1 using the glass bead and irregularly shaped glass particle distribution of Example 4, except treated with the silane adhesion promoter described in Example 1. A 50 micron reinforcing film of Surlyn™ 1705 Ionomer, a 5.5 melt flow index thermoplastic copolymer of ethylene and methacrylic acid containing a zinc ionic crosslinking agent, from Dupont, was extruded at about 210 Deg. C. onto a 90 micron thick, biaxially oriented and heat stabilized polyester terephthalate (PET) carrier. It was subsequently air corona treated at 0.5 Joules/sq. cm, hot laminated on the Surlyn™ film side to the bead coated and primed transfer carrier at about 140 Deg. C. and cooled to room temperature, followed by removal first, of the 90 micron PET and second, the transfer carrier, to result in an exposed glass bead surface on the Surlyn™ reinforcing film. This construction corresponds approximately to FIG. 3, wherein the Surlyn™ film is the substrate.

A free radical solution polymerized acrylic terpolymer pressure sensitive adhesive comprising by weight 70% isooctyl acrylate, 22.5% methyl acrylate and 7.5% acrylic acid, and having an intrinsic viscosity of about 0.6, and at about 42% solids in ethyl acetate solution, to which had been added by solids weight, 1.5% azo-bis-isobutyronitrile, was knife coated onto a silicone release liner and dried in a forced air oven at about 90 Deg. C. for 5 minutes, to result in about a 25 micron thickness. The Surlyn™ side of the above bead coated reinforcing film was air corona treated at about 0.5 Joules/sq. cm and laminated to the pressure sensitive adhesive coated release liner. This embodiment corresponds approximately to the FIG. 3A cross-section wherein the release liner is the substrate. It contained about 7.6% by average count per unit area irregular particles based on the total average count per unit area of the beads plus the irregular particles having at least one dimension equal to or greater than 25 microns. Subsequently, the release liner was removed and the film laminated to a painted auto panel to function as a low gloss protective film for the painted surface. This would again correspond approximately to FIG. 3A, wherein the painted auto panel is the substrate. The coefficient of friction of this surface was measured as in Example 2 and found to be about 0.207 with a standard deviation of about 0.004. The polyethylene surfaced sled showed no sign of scratching after five runs.

Comparative Example 6

The 50 micron Surlyn™ film on PET carrier of Example 5 was direct cascade coated with the same glass bead and irregular particle distribution of Example 5 at about 135 Deg. C. and then placed on a flat surface in a convection oven set at about 160 Deg. C. and embossed at about 4 kg force with a 152 mm wide steel roller. After cooling, the PET carrier was removed and the Surlyn™ side corona treated and laminated to the pressure sensitive adhesive as in Example 5. The resulting sheet corresponds approximately to FIG. 2 and had about 6.7% by average count per unit area irregular glass particles (equal to or greater than 25 microns in at least one dimension) based on the average total count per unit area of beads plus irregular particles on the surface. The sheet exhibited an abrasive tactility, similar to a fine emery cloth. This surface, when applied to a flat automotive painted panel as in Example 5 had a coefficient of friction as measured according to the described method of about 0.360, with a standard deviation of about 0.014. Additionally, the polyethylene surfaced sled exhibited visible surface scratches after each run, requiring replacement before each measurement.

Example 7

The transfer carrier of Example 1 was bead coated with the glass bead and irregularly shaped glass particle distribution of Example 5 and primed with the bead adhesive of Example 1, using the processes of Example 1. The resulting sheet which contained about 7% by average count per unit area of irregular particles (equal to or greater than 25 microns in at least one dimension) based on the total average count per unit area of the beads plus irregular particles, was then knife coated with the following substrate adhesive at about 100 microns wet thickness and gelled at 125 Deg. C. for 20 seconds:

100 parts SX864B polyamide modified vinyl plastisol from Plast-O-Meric.

1.5 parts of BASF Uvinol™ N-3039 a substituted acrylonitrile ultraviolet light absorber 0.5 parts of Ciba-Geigy Tinuvin™ 123 a hindered amine light stabilizer.

The resulting bead and adhesive coated transfer carrier, was thermally laminated at about 170 Deg. C. to a printed, smooth marine grade vinyl fabric, followed by cooling and removal of the transfer carrier. The resulting bead coated sheet, which corresponds approximately to the cross-section of FIG. 3, had a coefficient of friction, using the described method, of about 0.213 with a standard deviation of about 0.009, without visible evidence of scratching of the polyethylene surfaced sled during all five runs.

Example 8

The bead coated and primed transfer carrier of Example 5 was screen printed with a 230 mesh polyester screen using the ink of Example 3, except that the Obron aluminum pigment was left out. While the ink was still wet the sheet was dusted with a nylon/caprolactam copolymer powdered adhesive from Elf Atochem, M-548-080N. The sheet was subsequently dried at 80 Deg. C. for 10 minutes and the excess powder was blown off with a compressed air nozzle. The powder only adhered where the ink image was printed. The resulting transfer graphic corresponds approximately to the cross-section of FIG. 8. The transfer graphic was positioned on a piece of velvet automotive grade polyester seating fabric in a platen press set at about 120 Deg. C. and pressurized for about 15 seconds at about 1.5 Kg/sq. cm. It was then cooled to room temperature, whereupon the transfer carrier was removed, and heating repeated in the platen press for about 8 more seconds. The resulting low gloss blue image, which was embossed into the velvet fabric did not exhibit any retroreflective character, but exhibited a silky smooth tactility and had the appearance of being part of the fabric.

Example 9

The bead coated and adhesive coated transfer carrier of Example 1 was direct printed on the adhesive side opposite the embedded glass beads side in a Xeikon digital laser print engine with a multi-colored image, using the Xeikon 4 color polyester toner/developer process. The resulting imaged sheet was screen printed with the plastisol adhesive described in Example 7, using a 230 mesh polyester screen such that the screen printed image corresponded to the outside boundaries of the Xeikon printed ink image. The plastisol adhesive image was gelled as in Example 7. The resulting imaged transfer graphic sheet corresponds approximately to the cross-section of FIG. 12. The image was applied to a light tan polyester fabric by heating in a platen press at about 3 Kg/sq. cm. pressure and at 165 Deg. C. for about 22 seconds. After cooling to room temperature the transfer carrier was removed and the transferred image was heated for an additional 8 seconds in the platen press. The resulting low gloss image did not exhibit any retroreflection.

Example 10

Example 9 was repeated except that the screen printed substrate adhesive was modified with about 2.5 parts per hundred parts of plastisol adhesive with a pearl mica pigment, Afflair™ Silver Grey N WR II from EM Industries. In this case the resulting transferred image exhibited a low level retroreflectivity when a light source was behind the viewer, which enhanced the decorative nature of the image.

The following detailed description and examples have been given for clarity and understanding only. No unnecessary limitations are to be understood therefrom. The invention is not limited to the exact details shown and described, for variations obvious to one skilled in the art will be included within the invention defined by the claims.

I claim:

1. A glass bead coated article comprising:
   (a) a first adhesive layer;
   (b) a layer of a mixture of transparent glass beads intermixed with irregularly shaped glass particles, said mixture optionally treated with an adhesion promoter, wherein the layer of glass beads and irregularly shaped glass particles are partially embedded in the first adhesive layer such that about 20% to about 70% of the average diameter of the glass beads is exposed, wherein the first adhesive layer is capable of adhering to the mixture of the glass beads and the irregularly shaped glass particles;
   wherein the average cross-sectional diameter of the mixture of the glass beads and the irregularly shaped glass particles, for at least 95 percent by weight of the mixture ranges from about 20 microns to about 180 microns;
   wherein at least 95% by weight of the total number of glass beads and irregularly shaped glass particles fall within a threefold range such that the smallest and largest cross-sectional diameters differ by a factor of about 3 or less;
   wherein the bead coated article comprises at least about 3% irregularly shaped glass particles by average count per unit area of the glass bead coated article based on the average total count per unit area of the glass bead coated article of the glass beads plus the irregularly shaped glass particles, wherein the aforesaid average count of irregularly shaped glass particles is based on irregularly shaped glass particles having a cross-sectional diameter equal to or greater than the smallest cross-sectional diameter in the threefold range;
   wherein the glass beads and irregularly shaped glass particles have refractive indices of between about 1.5 and about 1.6;
   wherein the glass beads and irregularly shaped glass particles are positioned such that the coefficient of friction of a planer surface of the first adhesive having a continuous layer of the glass beads and irregularly shaped glass particles embedded therein is less than about 0.3.

2. The bead coated article of claim 1 which comprises about 3% to about 15% irregularly shaped glass particles by average count per unit area of the glass bead coated article based on the average total count per unit area of the glass bead coated article of the glass beads plus the irregularly shaped glass particles.

3. The bead coated article of claim 1 which comprises about 5% to about 15% irregularly shaped glass particles by average count per unit area of the glass bead coated article based on the average total count per unit area of the glass bead coated article of the glass beads plus the irregularly shaped glass particles.

4. The bead coated article of claim 1 which comprises about 6% to about 12% irregularly shaped glass particles by average count per unit area of the glass bead coated article based on the average total count per unit area of the glass bead coated article of the glass beads plus the irregularly shaped glass particles.

5. The bead coated article of claim 1 which further comprises one or more layers selected from the group consisting of substrate layers, adhesive layers, colored polymeric layers, and release layers bonded to the article on a side of the first adhesive layer opposite the embedded glass bead layer.

6. The bead coated article of claim 5 which further comprise a substrate selected from the group consisting of fabrics, polymer coated fabrics, leather, metal, paint coated metal, elastomers, paper, and polymeric films.

7. The bead coated article of claim 1 wherein the glass beads and irregularly shaped glass particles are treated with an adhesion promoter.

8. The bead coated article of claim 1 wherein the first adhesive layer is transparent and sufficiently thin such that it conforms to the spherical shape of the glass beads embedded therein.

9. The bead coated article of claim 1 which further comprises a substrate adhesive and a substrate, wherein the substrate is bonded to the surface of the first adhesive layer opposite the layer of embedded glass beads via the substrate adhesive.

10. The bead coated article of claim 1 which further comprises one or more colored polymeric layer(s) optionally disposed in the form of an image(s) and a substrate, wherein the colored polymeric layers are bonded between the transparent first adhesive layer on a side opposite the embedded glass beads and the substrate layer.

11. The bead coated article of claim 10 wherein the colored polymeric layer(s) are capable of adhering to the substrate layer.

12. The bead coated article of claim 1 wherein the first adhesive layer is pigmented.

13. The bead coated article of claim 5 wherein the colored polymeric layers are provided via a four color printing process.

14. The bead coated article of claim 1 wherein the layer of glass beads intermixed with irregularly shaped particles is in the form of an image.

15. The bead coated article of claim 1 wherein the first adhesive layer is also a substrate adhesive and is bonded to a substrate on a side opposite the layer of embedded glass beads and irregularly shaped glass particles.

16. A transfer article comprising:
(a) a transfer carrier, the transfer carrier comprising:
  (i) a support layer; and
  (ii) a thermoplastic glass bead release layer bonded to the support layer;
(b) a layer of a mixture of transparent glass beads and irregularly shaped glass particles, the mixture optionally treated with an adhesion promoter, formed on a side of the thermoplastic glass bead release layer opposite the support layer, such that the glass beads are embedded to between about 20% and about 70% of their average diameter in the thermoplastic glass bead release layer and at least some of the irregularly shaped glass particles are partially embedded in the thermoplastic glass bead release layer and some of the irregularly shaped glass particles are optionally, completely embedded in the thermoplastic glass bead release layer,
wherein at least 95% by weight of the total number of glass beads and irregularly shaped glass particles fall within a threefold range such that the smallest and largest cross-sectional diameters differ by a factor of about 3 or less;
wherein the average cross-sectional diameter of the mixture of the glass beads and the irregularly shaped glass particles, for at least 95 percent by weight of the mixture ranges from about 20 microns to about 180 microns;
wherein the glass beads and irregularly shaped glass particles have refractive indices of about 1.5 to about 1.6;
(c) a layer of a first adhesive, capable of adhering to the layer of the mixture of the glass beads and the irregularly shaped glass particles, the mixture optionally treated with an adhesion promoter; wherein the first adhesive layer is formed on the surfaces of the glass beads and irregularly shaped glass particles not embedded in the thermoplastic glass bead release layer such that the glass beads are embedded to between about 30% to about 80% of their average diameter in the first adhesive layer;
wherein the adhesion of the first adhesive to the glass beads is stronger than the adhesion of the thermoplastic release layer to the glass beads, wherein the aforesaid average count of irregularly shaped glass particles is based on irregularly shaped glass particles having a cross-sectional diameter equal to or greater than the smallest cross-sectional diameter in the threefold range;
wherein the transfer articles comprise at least about 3% irregularly shaped glass particles by average count per unit area of the transfer article based upon the total count of the glass beads plus the irregularly shaped glass particles per unit area of the transfer article;
wherein the glass beads and irregularly shaped glass particles are positioned such that upon removal of the transfer carrier from the transfer article the coefficient of friction of a planer surface of the first adhesive layer having a continuous layer of glass beads and irregularly shaped glass particles partially embedded therein is less than about 0.3.

17. The transfer article of claim 16 which comprises about 3% to about 15% irregularly shaped glass particles by average count per unit area of the transfer article based on the average total count per unit area of the transfer article of the glass beads plus the irregularly shaped glass particles.

18. The transfer article of claim 16 which comprises about 5% to about 15% irregularly shaped glass particles by average count per unit area of the transfer article based on the average total count per unit area of the transfer article of the glass beads plus the irregularly shaped glass particles.

19. The transfer article of claim 16 which comprises about 6% to about 12% irregularly shaped glass particles by average count per unit area of the transfer article based on the average total count per unit area of the transfer article of the glass beads plus the irregularly shaped glass particles.

20. The transfer article of claim 16 which further comprises one or more layers selected from the group consisting of substrate layers, adhesive layers, colored polymeric layers, and release layers bonded to the article on a side of the first adhesive layer opposite the embedded glass bead layer.

21. The transfer article of claim 20 which further comprise a substrate selected from the group consisting of fabrics, polymer coated fabrics, leather, metal, paint coated metal, elastomers, paper, and polymeric films.

22. The transfer article of claim 16 wherein the glass beads and irregularly shaped glass particles are treated with an adhesion promoter.

23. The transfer article of claim 16 wherein the first adhesive layer is transparent and sufficiently thin such that it conforms to the spherical shape of the glass beads embedded therein.

24. The transfer article of claim 16 which further comprises a substrate adhesive layer, wherein the substrate adhesive layer is bonded to the surface of the adhesive layer opposite the layer of embedded glass beads.

25. The transfer article of claim 16 which further comprises one or more colored polymeric layer(s) optionally disposed in the form of an image(s) and a substrate adhesive layer corresponding in shaped to the colored polymeric layer(s), wherein the colored polymeric layer(s) are bonded between the transparent first adhesive layer on a side opposite the embedded glass beads and the substrate adhesive layer.

26. The transfer article of claim 16 wherein the colored polymeric layer(s) are capable of adhering to the substrate layer.

27. The transfer article of claim 16 wherein the first adhesive layer is pigmented.

28. The transfer article of claim 20 wherein the colored polymeric layer(s) are provided via a four color printing process.

29. The transfer article of claim 16 wherein the first adhesive layer is discontinuous and wherein the first adhesive layer is capable of bonding to a substrate layer.

30. A method of making a transfer article, the method comprising the steps of:
(a) providing a transfer carrier, the transfer carrier comprising a thermoplastic glass bead release layer bonded to a support layer;
(b) partially embedding a layer of a mixture of transparent glass beads and irregularly shaped glass particles, the mixture optionally treated with an adhesion promoter such that the glass beads are embedded to between about 20% and about 70% of their average diameter in the thermoplastic glass bead release layer and at least some of the irregularly shaped glass particles are partially embedded in the release layer and some of the irregularly shaped glass particles are optionally, completely embedded in the release layer,
wherein the average cross-sectional diameter of the mixture of the glass beads and the irregularly shaped glass particles, for at least 95% by weight of the mixture ranges from about 20 microns to about 180 microns;
wherein at least 95% by weight of the total number of glass beads and irregularly shaped glass particles fall within a threefold range such that the smallest and largest cross-sectional diameters differ by a factor of about 3 or less;

wherein the transfer article comprises at least about 3% irregularly shaped glass particles by average count per unit area of the transfer article based on the average total count per unit area of the transfer article of the glass beads plus the irregularly shaped glass particles, wherein the aforesaid average count of irregularly shaped glass particles is based on irregularly shaped glass particles having a cross-sectional diameter equal to or greater than the smallest cross-sectional diameter in the threefold range;

wherein the glass beads and irregularly shaped glass particles have refractive indexes of about 1.5 to about 1.6;

(c) bonding a layer of a first adhesive layer over the surfaces of the glass beads and irregularly shaped glass particles not embedded in the thermoplastic release layer;

wherein the adhesion of the first adhesive layer to the glass beads is stronger than the adhesion of the thermoplastic release layer to the glass beads;

wherein the glass beads and irregularly shaped particles are positioned such that upon removal of the transfer carrier of the transfer article the coefficient of friction of a planer surface of the first adhesive layer having a continuous layer of the mixture of the glass beads and irregularly shaped glass particles partially embedded therein is less than about 0.3.

31. The method of claim 30 wherein the transfer article comprises at least about 3% to about 15% irregularly shaped glass particles by average count per unit area of the transfer article based on the average total count per unit area of the transfer article of the glass beads plus the irregularly shaped glass particles.

32. The method of claim 30 wherein the transfer article comprises about 5% to about 15% irregularly shaped glass particles by average count per unit area of the transfer article based on the average total count per unit area of the transfer article of the glass beads plus the irregularly shaped glass particles.

33. The method of claim 30 wherein the transfer articles comprises about 6% to about 12% irregularly shaped glass particles by average count per unit area of the transfer article based on the average total count per unit area of the transfer article of the glass beads plus the irregularly shaped glass particles.

34. The method claim 30 which further comprises the step of bonding one or more layers selected from the group consisting of substrate layers, adhesive layers, colored polymeric layers, and release layers bonded to the article on a side of the first adhesive layer opposite the embedded glass bead layer.

35. The method of claim 34 wherein the substrate is selected from the group consisting of fabrics, polymer coated fabrics, leather, metal, paint coated metal, elastomers, paper, and polymeric films.

36. The method of claim 30 wherein the glass beads and irregularly shaped glass particles are treated with an adhesion promoter.

37. The method of claim 30 wherein the first adhesive layer is transparent and sufficiently thin such that it conforms to the spherical shape of the glass beads embedded therein.

38. The method of claim 30 which further comprises a step of bonding a substrate to the surface of the adhesive layer opposite the layer of embedded glass beads via a substrate adhesive.

39. The method of claim 30 which further comprises a step of bonding one or more colored polymeric layer(s) optionally disposed in the form of an image(s) and a substrate to the transparent first adhesive layer, wherein the colored polymeric layer(s) are bonded between the transparent first adhesive layer on a side opposite the embedded glass beads and the substrate layer.

40. The method of claim 39 wherein the colored polymeric layer(s) are capable of adhering to the substrate layer.

41. The method of claim 30 wherein the first adhesive layer is pigmented.

42. The method of claim 39 wherein the colored polymeric layer(s) are provided via a four color printing process.

43. The method of claim 30 wherein the first adhesive layer is discontinuous and wherein the first adhesive layer is bonded to a substrate on a side opposite the layer of embedded glass beads and irregularly shaped glass particles.

* * * * *